United States Patent
Lumsden (10) Patent No.: US 8,619,443 B2
(45) Date of Patent: Dec. 31, 2013

(54) SYSTEM AND METHOD TO BOOST VOLTAGE

(75) Inventor: John L. Lumsden, Boca Raton, FL (US)

(73) Assignee: The Powerwise Group, Inc., Boca Raton, FL (US)

( * ) Notice: Subject to any disclaimer, the term of this patent is extended or adjusted under 35 U.S.C. 154(b) by 487 days.

(21) Appl. No.: 12/893,539

(22) Filed: Sep. 29, 2010

(65) Prior Publication Data

US 2012/0075896 A1    Mar. 29, 2012

(51) Int. Cl.
H02M 1/10    (2006.01)
G05F 1/10    (2006.01)

(52) U.S. Cl.
USPC .................................. 363/59; 363/142

(58) Field of Classification Search
USPC ........................ 363/59, 60, 142, 143
See application file for complete search history.

(56) References Cited

U.S. PATENT DOCUMENTS

| | | |
|---|---|---|
| 2,276,358 A | 3/1942 | Vickers |
| 2,345,933 A | 4/1944 | Ibbotson et al. |
| 3,440,512 A | 4/1969 | Hubby |
| 3,470,443 A | 9/1969 | Nola et al. |
| 3,470,446 A | 9/1969 | Nola et al. |
| 3,523,228 A | 8/1970 | Nola et al. |
| 3,541,361 A | 11/1970 | Nola |
| 3,582,774 A | 6/1971 | Forgacs |
| 3,671,849 A | 6/1972 | Kingston |
| 3,718,846 A | 2/1973 | Bejach |
| 3,740,629 A | 6/1973 | Kohlhagen |
| 3,753,472 A | 8/1973 | Dwbwad et al. |
| 3,851,995 A | 12/1974 | Mills |
| 3,860,858 A | 1/1975 | Nola |

(Continued)

FOREIGN PATENT DOCUMENTS

| | | |
|---|---|---|
| CN | 101207352 A | 6/2008 |
| EP | 0330477 A2 | 8/1989 |

(Continued)

OTHER PUBLICATIONS

PCT International Search Report, International Application No. PCT/US2010/050714, mailing date Jun. 29, 2011 (5 pages).

(Continued)

*Primary Examiner* — Jessica Han (57) ABSTRACT

A system and method are provided for increasing and maintaining voltage. A transformer's secondary windings are connected between the hot input line and the hot output line, and are not switched. The secondary windings may be in series for 220/230 Vrms, and in parallel for 120/127 Vrms. Alternatively, the transformer may be a single voltage type specifically for 230 V, 120 V, or any other voltage range. A microprocessor measures incoming voltage and controls an electronic switch on the primary windings side of the transformer to short circuit the primary windings when the transformer is not needed. When voltage boost is needed, the switch may be controlled to connect the primary windings to neutral. When the primary windings are switched to neutral, the secondary voltage adds to the incoming AC line voltage. There may be multiple taps on the primary windings selected by the microprocessor for providing differing boost levels at differing input voltage levels. The boosted voltage may be maintained at predetermined levels based upon the turns ratio of the transformer. There are several embodiments of electronic switches, including, but not limited to, a diode bridge circuit in conjunction with an IGBT device. Transformers with different current ratings and/or turns ratios may be removably connected with the system.

37 Claims, 6 Drawing Sheets

(56) References Cited

U.S. PATENT DOCUMENTS

| | | |
|---|---|---|
| 3,953,777 A | 4/1976 | McKee |
| 3,959,719 A | 5/1976 | Espelage |
| 3,976,987 A | 8/1976 | Anger |
| 4,039,946 A | 8/1977 | Nola |
| 4,052,648 A | 10/1977 | Nola |
| 4,096,436 A | 6/1978 | Cook et al. |
| 4,145,161 A | 3/1979 | Skinner |
| 4,168,491 A | 9/1979 | Phillips et al. |
| 4,220,440 A | 9/1980 | Taylor et al. |
| 4,266,177 A | 5/1981 | Nola |
| 4,324,987 A | 4/1982 | Sullivan, II et al. |
| 4,333,046 A | 6/1982 | Lee |
| 4,346,339 A | 8/1982 | Lewandowski |
| 4,353,025 A | 10/1982 | Dobkin |
| 4,363,605 A | 12/1982 | Mills |
| 4,388,585 A | 6/1983 | Nola |
| 4,391,155 A | 7/1983 | Bender |
| 4,392,100 A | 7/1983 | Stanton |
| 4,400,657 A | 8/1983 | Nola |
| 4,404,511 A | 9/1983 | Nola |
| 4,412,167 A | 10/1983 | Green et al. |
| 4,413,676 A | 11/1983 | Kervin |
| 4,417,190 A | 11/1983 | Nola |
| 4,420,787 A | 12/1983 | Tibbits |
| 4,426,614 A | 1/1984 | Nola |
| 4,429,269 A | 1/1984 | Brown |
| 4,429,578 A | 2/1984 | Darrel et al. |
| 4,433,276 A | 2/1984 | Nola |
| 4,439,718 A | 3/1984 | Nola |
| 4,454,462 A | 6/1984 | Spann |
| 4,456,871 A | 6/1984 | Stich |
| 4,469,998 A | 9/1984 | Nola |
| 4,489,243 A | 12/1984 | Nola |
| 4,490,094 A | 12/1984 | Gibbs |
| 4,513,240 A | 4/1985 | Putman |
| 4,513,274 A | 4/1985 | Halder |
| 4,513,361 A | 4/1985 | Rensink |
| 4,551,812 A | 11/1985 | Gurr et al. |
| 4,561,299 A | 12/1985 | Orlando et al. |
| 4,616,174 A | 10/1986 | Jorgensen |
| 4,644,234 A | 2/1987 | Nola |
| 4,649,287 A | 3/1987 | Nola |
| 4,659,981 A | 4/1987 | Lumsden |
| 4,679,133 A | 7/1987 | Moscovici |
| 4,689,548 A | 8/1987 | Mechlenburg |
| 4,706,017 A | 11/1987 | Wilson |
| 4,716,357 A | 12/1987 | Cooper |
| 4,819,180 A | 4/1989 | Hedman et al. |
| 4,841,404 A | 6/1989 | Marshall |
| 4,859,926 A | 8/1989 | Wolze |
| 4,876,468 A | 10/1989 | Libert |
| 4,971,522 A | 11/1990 | Butlin |
| 4,997,346 A | 3/1991 | Bohon |
| 5,003,192 A | 3/1991 | Beigel |
| 5,044,888 A | 9/1991 | Hester, II |
| 5,066,896 A | 11/1991 | Bertenshaw et al. |
| 5,134,356 A | 7/1992 | El-Sharkawi et al. |
| 5,136,216 A | 8/1992 | Wills et al. |
| 5,180,970 A | 1/1993 | Ross |
| 5,202,621 A | 4/1993 | Reischer |
| 5,204,595 A | 4/1993 | Opal et al. |
| 5,214,621 A | 5/1993 | Maggelet et al. |
| 5,222,867 A | 6/1993 | Walker, Sr. |
| 5,227,735 A | 7/1993 | Lumsden |
| 5,239,255 A | 8/1993 | Schanin et al. |
| 5,259,034 A | 11/1993 | Lumsden |
| 5,281,100 A | 1/1994 | Diederich |
| 5,299,266 A | 3/1994 | Lumsden |
| 5,332,965 A | 7/1994 | Wolf et al. |
| 5,350,988 A | 9/1994 | Le |
| 5,362,206 A | 11/1994 | Westerman et al. |
| 5,425,623 A | 6/1995 | London |
| 5,442,335 A | 8/1995 | Cantin et al. |
| 5,481,140 A | 1/1996 | Maruyama et al. |
| 5,481,225 A | 1/1996 | Lumsden et al. |
| 5,506,484 A | 4/1996 | Munro et al. |
| 5,543,667 A | 8/1996 | Shavit et al. |
| 5,559,685 A | 9/1996 | Lauw et al. |
| 5,572,438 A | 11/1996 | Ehlers et al. |
| 5,600,549 A | 2/1997 | Cross |
| 5,602,462 A | 2/1997 | Stich et al. |
| 5,614,811 A | 3/1997 | Sagalovich et al. |
| 5,615,097 A | 3/1997 | Cross |
| 5,625,236 A | 4/1997 | Lefebvre et al. |
| 5,635,826 A | 6/1997 | Sugawara |
| 5,637,975 A | 6/1997 | Pummer et al. |
| 5,652,504 A | 7/1997 | Bangerter |
| 5,699,276 A | 12/1997 | Roos |
| 5,732,109 A | 3/1998 | Takahashi |
| 5,747,972 A | 5/1998 | Baretich et al. |
| 5,754,036 A | 5/1998 | Walker |
| 5,821,726 A | 10/1998 | Anderson |
| 5,828,200 A | 10/1998 | Ligman et al. |
| 5,856,916 A | 1/1999 | Bonnet |
| 5,880,578 A | 3/1999 | Oliveira et al. |
| 5,909,138 A | 6/1999 | Stendahl |
| 5,936,855 A | 8/1999 | Salmon |
| 5,942,895 A | 8/1999 | Popovich et al. |
| 5,945,746 A | 8/1999 | Tracewell et al. |
| 5,946,203 A | 8/1999 | Jiang et al. |
| 5,994,898 A | 11/1999 | DiMarzio et al. |
| 6,005,367 A | 12/1999 | Rohde |
| 6,013,999 A | 1/2000 | Nola et al. |
| 6,055,171 A | 4/2000 | Ishii et al. |
| 6,104,737 A | 8/2000 | Mahmoudi |
| 6,118,239 A | 9/2000 | Kadah |
| 6,178,362 B1 | 1/2001 | Woolard et al. |
| 6,184,672 B1 | 2/2001 | Berkcan |
| 6,191,568 B1 | 2/2001 | Poletti |
| 6,198,312 B1 | 3/2001 | Floyd |
| 6,225,759 B1 | 5/2001 | Bogdan et al. |
| 6,259,610 B1 | 7/2001 | Karl et al. |
| 6,265,881 B1 | 7/2001 | Meliopoulos et al. |
| 6,274,999 B1 | 8/2001 | Fuji et al. |
| 6,297,610 B1 | 10/2001 | Bauer et al. |
| 6,325,142 B1 | 12/2001 | Bosley et al. |
| 6,326,773 B1 | 12/2001 | Okuma et al. |
| 6,346,778 B1 | 2/2002 | Mason et al. |
| 6,351,400 B1 | 2/2002 | Lumsden |
| 6,400,098 B1 | 6/2002 | Pun |
| 6,411,155 B2 | 6/2002 | Pezzani |
| 6,414,455 B1 | 7/2002 | Watson |
| 6,414,475 B1 | 7/2002 | Dames et al. |
| 6,426,632 B1 | 7/2002 | Clunn |
| 6,449,567 B1 | 9/2002 | Desai et al. |
| 6,459,606 B1 | 10/2002 | Jadric |
| 6,483,247 B2 | 11/2002 | Edwards et al. |
| 6,486,641 B2 | 11/2002 | Scoggins et al. |
| 6,489,742 B2 | 12/2002 | Lumsden |
| 6,490,872 B1 | 12/2002 | Beck et al. |
| 6,495,929 B2 | 12/2002 | Bosley et al. |
| 6,528,957 B1 | 3/2003 | Luchaco |
| 6,534,947 B2 | 3/2003 | Johnson et al. |
| 6,548,988 B2 | 4/2003 | Duff, Jr. |
| 6,548,989 B2 | 4/2003 | Duff, Jr. |
| 6,553,353 B1 | 4/2003 | Littlejohn |
| 6,592,332 B1 | 7/2003 | Stoker |
| 6,599,095 B1 | 7/2003 | Takada et al. |
| 6,618,031 B1 | 9/2003 | Bohn, Jr. et al. |
| 6,643,149 B2 | 11/2003 | Arnet et al. |
| 6,650,554 B2 | 11/2003 | Darshan |
| 6,657,404 B1 | 12/2003 | Clark et al. |
| 6,662,821 B2 | 12/2003 | Jacobsen et al. |
| 6,664,771 B2 | 12/2003 | Scoggins et al. |
| 6,678,176 B2 | 1/2004 | Lumsden |
| 6,690,594 B2 | 2/2004 | Amarillas et al. |
| 6,690,704 B2 | 2/2004 | Fallon et al. |
| 6,718,213 B1 | 4/2004 | Enberg |
| 6,724,043 B1 | 4/2004 | Ekkanath Madathil |
| 6,747,368 B2 | 6/2004 | Jarrett, Jr. |
| 6,770,984 B2 | 8/2004 | Pai et al. |
| 6,774,610 B2 | 8/2004 | Orozco |
| 6,781,423 B1 | 8/2004 | Knoedgen |
| 6,801,022 B2 | 10/2004 | Fa |

(56) References Cited

U.S. PATENT DOCUMENTS

| | | |
|---|---|---|
| 6,809,678 B2 | 10/2004 | Vera et al. |
| 6,836,099 B1 | 12/2004 | Amarillas et al. |
| 6,849,834 B2 | 2/2005 | Smolenski et al. |
| 6,891,478 B2 | 5/2005 | Gardner |
| 6,912,911 B2 | 7/2005 | Oh et al. |
| 6,952,355 B2 | 10/2005 | Riggio et al. |
| 6,963,195 B1 | 11/2005 | Berkcan |
| 6,963,773 B2 | 11/2005 | Waltman et al. |
| 7,010,363 B2 | 3/2006 | Donnelly et al. |
| 7,019,474 B2 | 3/2006 | Rice et al. |
| 7,019,498 B2 | 3/2006 | Pippin et al. |
| 7,019,992 B1 | 3/2006 | Weber |
| 7,019,995 B2 | 3/2006 | Niemand et al. |
| 7,045,913 B2 | 5/2006 | Ebrahim et al. |
| 7,049,758 B2 | 5/2006 | Weyhrauch et al. |
| 7,049,976 B2 | 5/2006 | Hunt et al. |
| 7,061,189 B2 | 6/2006 | Newman, Jr. et al. |
| 7,062,361 B1 | 6/2006 | Lane |
| 7,068,184 B2 | 6/2006 | Yee et al. |
| 7,069,161 B2 | 6/2006 | Giristina et al. |
| 7,081,729 B2 | 7/2006 | Chang et al. |
| 7,091,559 B2 | 8/2006 | Fragapane et al. |
| 7,106,031 B2 | 9/2006 | Hayakawa et al. |
| 7,119,576 B1 | 10/2006 | Langhammer et al. |
| 7,123,491 B1 | 10/2006 | Kusumi |
| 7,136,724 B2 | 11/2006 | Enberg |
| 7,136,725 B1 | 11/2006 | Paciorek et al. |
| 7,157,898 B2 | 1/2007 | Hastings et al. |
| 7,164,238 B2 | 1/2007 | Kazanov et al. |
| 7,168,924 B2 | 1/2007 | Beck et al. |
| 7,188,260 B1 | 3/2007 | Shaffer et al. |
| 7,205,822 B2 | 4/2007 | Torres et al. |
| 7,211,982 B1 | 5/2007 | Chang et al. |
| 7,227,330 B2 | 6/2007 | Swamy et al. |
| 7,245,100 B2 | 7/2007 | Takahashi |
| 7,250,748 B2 | 7/2007 | Hastings et al. |
| 7,256,564 B2 | 8/2007 | MacKay |
| 7,259,546 B1 | 8/2007 | Hastings et al. |
| 7,263,450 B2 | 8/2007 | Hunter |
| 7,279,860 B2 | 10/2007 | MacKay |
| 7,288,911 B2 | 10/2007 | MacKay |
| 7,298,132 B2 | 11/2007 | Woolsey et al. |
| 7,298,133 B2 | 11/2007 | Hastings et al. |
| 7,301,308 B2 | 11/2007 | Aker et al. |
| 7,309,973 B2 | 12/2007 | Garza |
| 7,330,366 B2 | 2/2008 | Lee et al. |
| 7,336,463 B2 | 2/2008 | Russell et al. |
| 7,336,514 B2 | 2/2008 | Amarillas et al. |
| 7,349,765 B2 | 3/2008 | Reaume et al. |
| 7,355,865 B2 | 4/2008 | Royak et al. |
| 7,358,724 B2 | 4/2008 | Taylor et al. |
| 7,378,821 B2 | 5/2008 | Simpson, III |
| 7,386,713 B2 | 6/2008 | Madter et al. |
| 7,394,397 B2 | 7/2008 | Nguyen et al. |
| 7,397,212 B2 | 7/2008 | Turner |
| 7,397,225 B2 | 7/2008 | Schulz |
| 7,412,185 B2 | 8/2008 | Hall et al. |
| 7,417,410 B2 | 8/2008 | Clark, III et al. |
| 7,417,420 B2 | 8/2008 | Shuey |
| 7,436,233 B2 | 10/2008 | Yee et al. |
| 7,446,514 B1 | 11/2008 | Li et al. |
| 7,525,296 B2 | 4/2009 | Billig et al. |
| 7,528,503 B2 | 5/2009 | Rognli et al. |
| 7,561,977 B2 | 7/2009 | Horst et al. |
| 7,602,136 B2 | 10/2009 | Garza |
| 7,605,495 B2 | 10/2009 | Achart |
| 7,615,989 B2 | 11/2009 | Kojori |
| 7,622,910 B2 | 11/2009 | Kojori |
| 7,667,411 B2 | 2/2010 | Kim et al. |
| 7,693,610 B2 | 4/2010 | Ying |
| 7,719,214 B2 | 5/2010 | Leehey et al. |
| 7,746,003 B2 * | 6/2010 | Verfuerth et al. ............ 315/276 |
| 7,768,221 B2 | 8/2010 | Boyadjieff et al. |
| 7,788,189 B2 | 8/2010 | Budike, Jr. |
| 7,791,326 B2 | 9/2010 | Dahlman et al. |
| 7,797,084 B2 | 9/2010 | Miwa |
| 7,848,897 B2 | 12/2010 | Williams, Jr. |
| 7,882,383 B2 | 2/2011 | May et al. |
| 7,902,788 B2 | 3/2011 | Garza |
| 7,911,173 B2 | 3/2011 | Boyadjieff |
| 7,919,958 B2 | 4/2011 | Oettinger et al. |
| 7,977,842 B2 | 7/2011 | Lin |
| 8,004,255 B2 | 8/2011 | Lumsden |
| 8,085,009 B2 | 12/2011 | Lumsden |
| 8,085,010 B2 | 12/2011 | Lumsden |
| 8,120,307 B2 | 2/2012 | Lumsden |
| 8,333,265 B2 | 12/2012 | Kang et al. |
| 8,374,729 B2 | 2/2013 | Chapel et al. |
| 2001/0010032 A1 | 7/2001 | Ehlers et al. |
| 2002/0079859 A1 | 6/2002 | Lumsden |
| 2002/0109477 A1 | 8/2002 | Ikezawa |
| 2003/0090362 A1 | 5/2003 | Hardwick |
| 2003/0181288 A1 | 9/2003 | Phillippe |
| 2004/0010350 A1 | 1/2004 | Lof et al. |
| 2004/0047166 A1 | 3/2004 | Lopez-Santillana et al. |
| 2004/0095237 A1 | 5/2004 | Chen et al. |
| 2004/0153170 A1 | 8/2004 | Santacaterina et al. |
| 2004/0181698 A1 | 9/2004 | Williams |
| 2004/0189265 A1 | 9/2004 | Rice et al. |
| 2004/0239335 A1 | 12/2004 | McClelland et al. |
| 2005/0033951 A1 | 2/2005 | Madter et al. |
| 2005/0068013 A1 | 3/2005 | Scoggins |
| 2005/0073295 A1 | 4/2005 | Hastings et al. |
| 2006/0038530 A1 | 2/2006 | Holling |
| 2006/0049694 A1 | 3/2006 | Kates |
| 2006/0103365 A1 | 5/2006 | Ben-Yaacov |
| 2006/0103549 A1 | 5/2006 | Hunt et al. |
| 2006/0125422 A1 | 6/2006 | Costa |
| 2006/0175674 A1 | 8/2006 | Taylor et al. |
| 2006/0276938 A1 | 12/2006 | Miller |
| 2007/0024250 A1 | 2/2007 | Simpson, III |
| 2007/0024264 A1 | 2/2007 | Lestician |
| 2007/0037567 A1 | 2/2007 | Ungless et al. |
| 2007/0069668 A1 | 3/2007 | Mackay |
| 2007/0071047 A1 | 3/2007 | Huang et al. |
| 2007/0211400 A1 | 9/2007 | Weiher et al. |
| 2007/0213776 A1 | 9/2007 | Brink |
| 2007/0244603 A1 | 10/2007 | Level |
| 2007/0279053 A1 | 12/2007 | Taylor et al. |
| 2007/0283175 A1 | 12/2007 | Marinkovic et al. |
| 2007/0290645 A1 | 12/2007 | Boyadjieff et al. |
| 2007/0300084 A1 | 12/2007 | Goodrum et al. |
| 2007/0300085 A1 | 12/2007 | Goodrum et al. |
| 2008/0005044 A1 | 1/2008 | Benya et al. |
| 2008/0043506 A1 | 2/2008 | Ozaki et al. |
| 2008/0049452 A1 | 2/2008 | Van Bodegraven |
| 2008/0104430 A1 | 5/2008 | Malone et al. |
| 2008/0116825 A1 | 5/2008 | Descarries et al. |
| 2008/0121448 A1 | 5/2008 | Betz et al. |
| 2008/0177678 A1 | 7/2008 | Di Martini et al. |
| 2008/0221737 A1 | 9/2008 | Josephson et al. |
| 2008/0272934 A1 | 11/2008 | Wang et al. |
| 2008/0281473 A1 | 11/2008 | Pitt |
| 2008/0290731 A1 | 11/2008 | Cassidy |
| 2008/0291607 A1 | 11/2008 | Braunstein et al. |
| 2009/0018706 A1 | 1/2009 | Wittner |
| 2009/0045804 A1 | 2/2009 | Durling et al. |
| 2009/0046490 A1 | 2/2009 | Lumsden |
| 2009/0051344 A1 | 2/2009 | Lumsden |
| 2009/0062970 A1 | 3/2009 | Forbes, Jr. et al. |
| 2009/0063228 A1 | 3/2009 | Forbes, Jr. |
| 2009/0083167 A1 | 3/2009 | Subbloie |
| 2009/0085545 A1 | 4/2009 | Shen et al. |
| 2009/0088907 A1 | 4/2009 | Lewis et al. |
| 2009/0094173 A1 | 4/2009 | Smith et al. |
| 2009/0105888 A1 | 4/2009 | Flohr et al. |
| 2009/0154206 A1 | 6/2009 | Fouquet et al. |
| 2009/0160267 A1 | 6/2009 | Kates |
| 2009/0189581 A1 | 7/2009 | Lawson et al. |
| 2009/0200981 A1 | 8/2009 | Lumsden |
| 2010/0001704 A1 | 1/2010 | Williams |
| 2010/0013427 A1 | 1/2010 | Kelley |
| 2010/0014989 A1 | 1/2010 | Tsuruta et al. |
| 2010/0033155 A1 | 2/2010 | Lumsden |

(56) References Cited

U.S. PATENT DOCUMENTS

| | | |
|---|---|---|
| 2010/0054001 A1 | 3/2010 | Dyer et al. |
| 2010/0117588 A9 | 5/2010 | Kelley |
| 2010/0138066 A1 | 6/2010 | Kong |
| 2010/0145542 A1 | 6/2010 | Chapel et al. |
| 2010/0148866 A1 | 6/2010 | Lee et al. |
| 2010/0191385 A1 | 7/2010 | Goodnow et al. |
| 2010/0228398 A1 | 9/2010 | Powers et al. |
| 2010/0250590 A1 | 9/2010 | Galvin |
| 2010/0277955 A1 | 11/2010 | Duan et al. |
| 2010/0283423 A1 | 11/2010 | Boyadjieff |
| 2010/0305771 A1 | 12/2010 | Rodgers |
| 2010/0320956 A1 | 12/2010 | Lumsden et al. |
| 2011/0080130 A1 | 4/2011 | Venkataraman |
| 2011/0121775 A1 | 5/2011 | Garza |
| 2011/0182094 A1 | 7/2011 | Lumsden et al. |
| 2012/0213645 A1 | 8/2012 | Lumsden et al. |

FOREIGN PATENT DOCUMENTS

| | | |
|---|---|---|
| EP | 1650860 B1 | 8/2008 |
| EP | 2183849 B1 | 5/2010 |
| GB | 652558 | 4/1951 |
| GB | 652558 A | 4/1951 |
| GB | 1046446 | 10/1966 |
| GB | 1512407 | 6/1978 |
| JP | 2006-261594 | 9/1994 |
| JP | 11-007328 A | 1/1999 |
| JP | 2011-007328 A | 1/1999 |
| JP | 2011-007328 A | 1/1999 |
| JP | 2011-132155 | 5/1999 |
| JP | 11-241687 A | 9/1999 |
| JP | 11-241687 A | 9/1999 |
| JP | 2011-241687 | 9/1999 |
| JP | 2000-125548 A | 4/2000 |
| JP | 2000125548 | 4/2000 |
| JP | 2001-245496 | 9/2001 |
| JP | 2001-245496 A | 9/2001 |
| JP | 2004-351492 | 12/2004 |
| JP | 2005-227795 | 8/2005 |
| JP | 2009535013 A | 9/2009 |
| JP | 2010-502533 A | 1/2010 |
| JP | 2010-502533 A | 1/2010 |
| KR | 10-2001-0006838 A | 1/2001 |
| KR | 10-2001-0006838 A | 1/2001 |
| KR | 10-2009-0009872 | 1/2009 |
| KR | 10-2009-0009872 A | 1/2009 |
| MX | 298359 | 2/2009 |
| MX | 303414 | 5/2010 |
| WO | WO-80/02895 | 12/1980 |
| WO | WO-91/03093 A1 | 3/1991 |
| WO | WO9103093 A1 | 3/1991 |
| WO | WO-92/16041 A1 | 9/1992 |
| WO | WO9216041 A1 | 9/1992 |
| WO | WO 00-66892 | 11/2000 |
| WO | WO 00/66892 | 11/2000 |
| WO | WO-00-66892 A1 | 11/2000 |
| WO | WO 2006/021079 A1 | 3/2006 |
| WO | WO 2008/008745 A2 | 1/2008 |
| WO | WO-2008-051386 A2 | 5/2008 |
| WO | WO-2008-150458 A1 | 12/2008 |
| WO | WO 2010/114916 A1 | 10/2010 |
| WO | WO2011/031603 A1 | 3/2011 |
| WO | WO 2012/030403 A1 | 3/2012 |
| WO | WO 2012/044289 A1 | 4/2012 |
| WO | WO 2012/050635 A1 | 4/2012 |

OTHER PUBLICATIONS

PCT Written Opinion of the International Searching Authority, International Application No. PCT/US2010/050714, mailing date Jun. 29, 2011 (3 pages).

PCT Notification of Transmittal of the International Search Report and the Written Opinion of the International Searching Authority, or the Declaration, from the International Searching Authority Korea (ISA/KR) Korean Intellectual Property Office mailed Sep. 7, 2011; corresponding to U.S. Appl. No. 12/967,128, now Publication No. US2011/0080130 A1 (our file No. 133) (9 pages).

Extended European Search Report, European Patent Office, for Application No. 08795029.1-1242/2183849 PCT/US2008009393 dated Aug. 1, 2011; corresponding U.S. Appl. No. 12/185,442, now Publication No. US2009/0046490 A1 (our file No. 113) (10 pages).

PCT Notification of Transmittal of the International Search Report and the Written Opinion of the International Searching Authority, or the Declaration, from the International Searching Authority Korea (ISA/KR) Korean Intellectual Property Office mailed Jun. 29, 2011 corresponding to U.S. Appl. No. 12/893,539 (not yet published) (our file No. 127) (8 pages).

English language translation of Japanese Patent JP-11-007328 A above (13 pages).

English language translation of Japanese Patent JP 11241687 above (16 pages).

English language translation of Japanese Patent JP 2001-245496 above (14 pages).

English language translation of Japanese Patent JP 2010-502533 A above (16 pages).

PCT Notification of Transmittal of the International Search Report and the Written Opinion of the International Searching Authority, or the Declaration, from the International Searching Authority USA (ISA/US) mailed Oct. 6, 2008; corresponding to U.S. Appl. No. 12/185,442, now Publication No. US2009/0046490 A1 (our file No. 113) (15 pages).

Frick, Vincent, Member, IEEE; Hebrard, Luc, Member, IEEE; Poure, Phillippe; Anstotz, Freddy; Braun, Francis; "CMOS Microsystem for AC Current Measurement with Galvanic Isolation"; IEEE Sensors Journal, vol. 3, No. 6, Dec. 2003; see NPL-H (our file 113) where considered a "Y" reference (9 pages).

PCT Notification Concerning Transmittal of International Preliminary Report on Patentability mailed Feb. 20, 2010 from the International Bureau of WIPO; corresponding to U.S. Appl. No. 12/185,442, now Publication No. US2009/0046490 A1 (our file No. 113) (14 pages).

PCT Notification of Transmittal of the International Search Report and the Written Opinion of the International Searching Authority, or the Declaration, from the International Searching Authority USA (ISA/US) mailed Nov. 6, 2008; corresponding to U.S. Appl. No. 12/187,136, now Publication No. US2009/0051344 A1 (our file No. 114) (15 pages).

PCT Notification of Transmittal of the International Search Report and the Written Opinion of the International Searching Authority, or the Declaration, from the International Searching Authority USA (ISA/US) mailed Nov. 18, 2008; corresponding to U.S. Appl. No. 12/187,186, now Publication No. US2009/0200981 A1 (our file No. 115) (9 pages).

PCT Notification of Transmittal of the International Search Report and the Written Opinion of the International Searching Authority, or the Declaration, from the International Searching Authority USA (ISA/US) mailed Oct. 6, 2008; corresponding to U.S. Appl. No. 12/187,805, now Publication No. US2010/0033155 A1 (our file No. 116) (7 pages).

PCT Notification Concerning Transmittal of International Preliminary Report on Patentability mailed Feb. 17, 2011 from the International Bureau of WIPO; International Application No. PCT/US2008/009533 corresponding to U.S. Appl. No. 12/187,805, now Publication No. US2010/0033155 A1 (our file No. 116) (6 pages).

PCT Notification of Transmittal of the International Search Report and the Written Opinion of the International Searching Authority, or the Declaration, from the International Searching Authority USA (ISA/US) mailed Nov. 25, 2008; corresponding to International Application No. PCT/US 08/10720 and U.S. Appl. No. 12/207,913, now Publication No. US2010/0013427 A1 (our file No. 117) (8 pages).

PCT Notification Concerning Transmittal of International Preliminary Report on Patentability mailed Mar. 25, 2010 from the International Bureau of WIPO; corresponding to International Application No. PCT/US2008/1010720 and U.S. Appl. No. 12/207,913, now Publication No. US2010/0013427 A1 (our file No. 117) (7 pages).

(56) References Cited

OTHER PUBLICATIONS

English language translation of Official Action from the Eurasian Patent Office pertaining to Application No. 201070369/(OFE/1004/0111) and original Office Action both corresponding to PCT Application No. US 2008/010720 dated Apr. 26, 2011 and U.S. Appl. No. 12/207,913, now Publication No. US2010/0013427 A1 (our file No. 117) (2 pages).
PCT Notification of Transmittal of the International Search Report and the Written Opinion of the International Searching Authority, or the Declaration, from the International Searching Authority USA (ISA/US), mailed Oct. 15, 2010; corresponding to U.S. Appl. No. 12/873,510, now Publication No. US2010/0320956 A1 (our file No. 123) (11 pages).
International Search Report for International Application No. PCT/US2008/009393, dated Oct. 6, 2008 (3 pages).
Written Opinion of the International Searching Authority for International Application No. PCT/US2008/009393, dated Oct. 6, 2008 (13 pages).
Frick, Vincent, et al., "CMOS Microsystem for AC Current Measurement With Galvanic Isolation," IEEE Sensors Journal, Dec. 2003, pp. 752-760, vol. 3, No. 6, © 2003 IEEE (9 pages).
International Search Report for International Application No. PCT/US2008/009482, dated Nov. 6, 2008 (2 pages).
Written Opinion of the International Search Authority for International Applicaton No. PCT/US2008/009482, dated Nov. 6, 2008 (11 pages).
International Search Report for International Application No. PCT/US2008/009483, dated Nov. 18, 2008 (2 pages).
Written Opinion of the International Search Authority for International Application No. PCT/US2008/009483, dated Nov. 18, 2008 (6 pages).
International Search Report for International Application No. PCT/US2008/009533, dated Oct. 6, 2008 (2 pages).
Written Opinion of the International Search Authority for International Application No. PCT/US2008/009533, dated Oct. 6, 2008 (5 pages).
International Search Report for International Application No. PCT/US2008/010720, dated Nov. 25, 2008 (2 pages).
Written Opinion of the International Search Authority for International Application No. PCT/US2008/010720, dated Nov. 25, 2008 (4 pages).
International Search Report for International Application No. PCT/US2010/047477, dated Oct. 15, 2010 (this corresponds with U.S. Appl. No. 12/873,510) (3 pages).
Written Opinion of the International Searching Authority for International Application No. PCT/US2010/047477, dated Oct. 15, 2010 (this corresponds with U.S. Appl. No. 12/873,510) (7 pages).
Kolomoitsev, K.V., "Voltage control with the aid of a booster [three phase supply lines]," Promyshlennaya Energetika, Jul. 1979, pp. 38-39, No. 7, USSR (Abstract only) (1 page).
Frick, Vincent, Member, IEEE; Hebrard, Luc, Member, IEEE; Poure, Phillippe; Anstotz, Freddy; Braun, Francis; "CMOS Microsystem for AC Current Measurement with Galvanic Isolation"; IEEE Sensors Journal, vol. 3, No. 6, Dec. 2003; see NPL-H (our file 113) where considered a "Y" reference (9 pages); and cited in Chinese Office Action NPL HH.
International Search Report for International Application No. PCT/US2008/009393, dated Oct. 6, 2008 (our matter 113) (3 pages) (see NPL H ).
Written Opinion of the International Searching Authority for International Application No. PCT/US2008/009393, dated Oct. 6, 2008 (our matter 113) (13 pages) (see NPL H ).
Kolomoitsev, K.V.; "Voltage Control with the Aid of a Booster [Three Phase Supply Lines]"; Promyshlennaya Energetika, n 7, 38-9, Jul. 1979 (Language: Russian); ISSN: 0033-1155; Country of Publication: USSR; Abstract: Describes techniques of voltage control, or voltage maintenance, at the terminals of consumers, in 127/220 or 220/380 V supply lines. This is achieved using voltage boosters, consisting of regulating autotransformers and voltage boosting transformers, whose secondary windings are connected into the a.c. line. Voltage regulation is achieved by changing the additional e.m.f. in the windings of a boosting transformer with the aid of regulating autotransformers. Two-sided regulation at the output of a three-phse 220/380 V regulator is obtained by connecting the primary winding of the boosting transformer to the middle output and to the moving contact of the compensating regulating autotransformer.
International Search Report for International Application No. PCT/US2008/009482, dated Nov. 6, 2008 (our matter 114) (2 pages) (see NPL K).
Written Opinion of the International Search Authority for International Application No. PCT/US2008/009482, dated Nov. 6, 2008 (our matter 114) (11 pages) (see NPL K).
International Search Report for International Application No. PCT/US2008/009483, dated Nov. 18, 2008 (our matter 115) (2 pages) (see NPL L ).
Written Opinion of the International Search Authority for International Application No. PCT/US2008/009483, dated Nov. 18, 2008 (our matter 115) (6 pages) (see NPL L ).
International Search Report for International Application No. PCT/US2008/009533, dated Oct. 6, 2008 (our matter 116) (2 pages) (see NPL M ).
Written Opinion of the International Search Authority for International Application No. PCT/US2008/009533, dated Oct. 6, 2008 (our matter 116) (5 pages) (see NPL M ).
International Search Report for International Application No. PCT/US2008/010720, dated Nov. 25, 2008 (our matter 117) (2 pages) (see NPL O ).
Written Opinion of the International Search Authority for International Application No. PCT/US2008/010720, dated Nov. 25, 2008 (our matter 117) (4 pages) (see NPL O ).
First Non-Final Office Action mailed Feb. 3, 2011, U.S. Appl. No. 12/187,186, filed Aug. 6, 2008, (19 pages) (our matter 115).
Response and Amendment to First Non-Final Office Action mailed Apr. 8, 2011, U.S. Appl. No. 12/187,186, filed Aug. 6, 2008, (32 pages) (our matter 115).
Final Office Action mailed Jun. 13, 2011, U.S. Appl. No. 12/187,186, filed Aug. 6, 2008, (23 pages) (our matter 115).
PCT Notification of Transmittal of the International Search Report and the Written Opinion of the International Searching Authority, or the Declaration, from the International Searching Authority USA (ISA/US) mailed Jan. 2, 2012; corresponding to U.S. Appl. No. 13/026,931, now Publication No. US2011/0182094 A1 (our file No. 128) (9 pages)
Notification of the First Office Action dated Dec. 23, 2011, State Intellectual Property Office of People's Republic of China; Chinese National Phase of PCT Application No. 200880111387.0, with English translation (our matter 113) (19 pages).
Substantive Examination Report Stage I, Indonesian National Phase of PCT Application No. W-00201000702 with English translation (our matter 113) (3 pages).
Response to extended European Search Report of Aug. 1, 2011 (NPL B ) and Response to Communication pursuant to Rules 70(2) and 70A(2) EPC of Aug. 18, 2011, dated Feb. 24, 2012, European Patent Application No. 08795029.1 (our matter 113) (12 pages).
Office Action from Mexican Patent Office dated Oct. 20, 2011 for Mexican National Phase of PCT Application No. MX/a/2010/001755 (our matter 113) (2 pages).
Response to NPL KK dated Mar. 9, 2012 conforming Mexican claims to corresponding US Patent No. 8,085,009 B2 (our matter 113) (50 pages).
Notice of Allowance from Mexican Patent Office dated Mar. 15, 2012 resulting from Response of NPL LL (our matter 113) (1 page).
Office Action from Eurasian Patent Office dated Feb. 21, 2011 signed by Official Patent for Application No. 201070276/31 filed Mar. 12, 2010 with English translation (our matter 113) (2 pages).
Response to NPL NN dated May 10, 2011 (our matter 113) (17 pages).
Notice of Allowance from Eurasian Patent Office dated Sep. 13, 2011 signed by Official Patent for Application No. 201070276/31 filed Mar. 12, 2010 with English translation as a result of NPL OO (our matter 113) (2 pages).
Response to NPL PP dated Jan. 13, 2012 adding new claims of U.S. Appl. No. 13/331,757 (our matters 113 and 139) (16 pages).

(56) References Cited

OTHER PUBLICATIONS

Response and Amendment to Aug. 3, 2011 Non-Final Office Action filed Oct. 31, 2011, U.S. Appl. No. 12/207,913 (our matter 117) (23 pages).
Response to Mexican Office Action dated Feb. 6, 2012 for Application No. MX/a/2010/002859, distinguishing US 6,274,999 B1 to Fuji, et al. and US 5,828,200 to Ligman, et al. while conforming the Mexican claims to corresponding U.S. Appl. No. 12/207,913 (our matter 117MX) (21 pages).
Notice of Allowance from Mexican Patent Office dated Apr. 24, 2012 signed by Official Patent for Application No. MX/a/2010/002859 filed Sep. 15, 2008 (our matter 117MX) (2 pages).
Office Action from Mexican Patent Office dated Nov. 25, 2011 for Application No. MX/a/2010/002859 filed Sep. 15, 2008 (our matter 117MX) (2 pages) (see NPL SS for Response).
Notification of the necessity to submit additional materials and arguing some claims lack of novelty in view of US 5,828,200 to Ligman et al. (Abstract, col. 3, Ins. 1-65, and claims and description relating to FIGS. 1 and 3B) and US 6,449,567 to Desai from Eurasian Patent Office dated Apr. 26, 2011 signed by Offictal Patent for Application No. 201070369/(OFE/1004/0111) filed Apr. 13, 2010 with English translation (our matter 117EA) (2 pages).
Notification of Eurasian Patent Office Readiness to Grant Patent dated Dec. 15, 2011 signed by leading Patent for Application No. 201070369/ (OFE/1004/0111) filed Apr. 13, 2010 with English translation (our matter 117EA) (2 pages).
Response to NPL WW dated Apr. 3, 2012 for Eurasian Application No. 201070369 (our matter 117EA) (16 pages).
Office Action from the Indonesian Patent Office (Substantive Examination Report Stage 1) for Application No. W-00201000893 with English translation arguing lack of novelty in view of International Search Authority for PCT/US2008/10720 (see NPL BB) (our matter 117ID) (2 pages).
Response to NPL YY dated Mar. 5, 2012 for Application No. W-00201000893 with English translation distinguishing US 5,828,200 to Ligman and US 6,449,567 to Desai (our matter 117ID) (15 pages).
Final Office Action in U.S. Appl. No. 12/207,913 mailed from the USPTO on Mar. 14, 2012 relying on US 6,274,999 to Fuji and US 6,489,742 to Lumsden (our matter 117) (17 pages).
Extended European Search Report from the European Patent Office in Application No. 08830045.4 dated Aug. 22, 2012 (our matter 117EP) (8 pages).
Notice of Reasons for Refusal of Patent Application No. 2010-524881 mailed from the Japanese Patent Office on Aug. 28, 2012 relying on Japanese Unexamined Patent Publication HE16-261594 with English translation (our matter 117JP), see NPL 4R (6 pages).
Response to final Office Action of NPL 3A for U.S. Appl. No. 12/207,913, filed with the USPTO on Sep. 13, 2012 (our matter 117) (32 pages).
Sul, S K and Park, M H: "A novel Technique for Optimal Efficiency Control of a Current-Source Inverter-Fed Induction Motor", IEEE Transactions on Power .Electronics, vol. 3, No. 2, Apr. 1, 1988, pp. 192-199, XP002063874, ISSN: 0885-8993, DOI: 10.1109/63.4349, p. 2, left-hand column, line 9—p. 4, left-hand column, line 29; FIGS. 4-8 (8 pages): clean copy retrieved from IEEE databank attached, considered to be particularly relevant if taken alone, see NPL 3B and 4O (our matter 117EP) (8 pages).
Flemming Abrahamsen, et al,: "On the Energy Optimized Control of Standard and High-Efficiency Induction Motors in CT and HVAC Applications", IEEE Transactions on Industry Applications, IEEE Service Center, Piscataway, NJ, US, vol. 34, No. 4, Aug. 1, 1998, XP011022398, ISSN: 0093-9994, p. 4, right-hand column, fine 11—p. 5, left-hand column, line 5; Fig. 9 (10 pages); ); IEEE databank attached, considered to be particularly relevant if taken alone, see NPL 3B and 4P (our matter 117EP) (10 pages).
Office Action issued by the State Intellectual Property Office (SIPO) on Apr. 28, 2012 for Chinese Application No. 200880115946 (PCT/US2008/010720) relying on US 6,274,999 B1 to Fuji, with English translation (our matter 117CN) (21 pages).

Office Action issued by the Colombian Patent Office in U.S. Appl. No. 10/042,683 (PCT/US2008/010720) relying on US 6,274,999 B1 to Fuji and US 6,489,742 to Lumsden, with English translation (our matter 117CO) (24 pages).
Office Action from Eurasian Pinent Office dated Aug. 16, 2012 for Application No. 201070369/31 with English translation (our matter 117EA) (4 pages).
European Patent Office grant of patent dated Jun. 4, 2012, European Patent Application No. 08795029.1-1242 (our matter 113EP) (61 pages).
Response to NPL 3J above requesting deletion of text added to claims 1 and 10 dated Sep. 19, 2012, European Patent Application No. 08795029.1-1242 (our matter 113EP) (2 pages).
Office Action from the Eurasian Patent Office dated May 28, 2012, Eurasian Patent Application No. 201070276/31 (our matter 113EA) (English translation. 2 pages).
Response to NPL 3L including reference Nos. for 96 claims as filed in U.S. Appl. No. 13/331,757 on or between Sep. 20 and 27, 2012 (our matter 139EA) (12 pages).
Response to NPL HH dated Jul. 9, 2012 amending claims to claims 1-77 of US Patent No. 8,085,009 (our matter 113CN) (24 pages).
International Search Report and Written Opinion for International Application No. PCT/US2012/035844 dated Nov. 16, 2012 corresponding to US2012/0213645 A1 (our matter 135) (8 pages).
Patent Cooperation Treaty Notification Concerning Transmittal of International Preliminary Report on Patentability (Chapter 1 of the Patent Cooperation Treaty) (PCT Rule 44bis.1(c) mailed, Mar. 14, 2013 for PCT Application corresponding to International Application No. PCT/US2011/020326, filed on Jan. 6, 2011, and published as WO 2012/030403 on Mar. 2, 2012, corresponding to U.S. Appl. No. 12/967,128 published as US-2011/0080130 A1 (our matter 0133) (6 pages).
Office Action from the U.S. Patent and Trademark Office mailed Feb. 22, 2013 corresponding to U.S. Appl. No. 12/207,913, republished as US-2010/0117588 A1 (our matter 01117US) (48 pages).
Office Action from the State Intellectual Property Office mailed Mar. 29, 2013 for Chinese Application No. 200880115946.5 (our matter 0117CN) with English translation corresponding to U.S. Appl. No. 12/207,913, republished as US-2010/0117588 A1 (our matter 0117US) (19 pages).
Response to Office Action from the State Intellectual Property Office dated Mar. 29, 2013 (NPL 3R) for Chinese Application No. 200880115946.5 (our matter 0117CN) corresponding to U.S. Appl. No. 12/207,913, republished as US-2010/0117588 A1 (our matter 0117US) (13 pages).
Notice of Allowance form the U.S. Patent and Trademark Office mailed Jun. 11, 2013 for U.S. Appl. No. 13/451,041, published as US-2012/0213645 A1 (our matter 0135US) (49 pages).
Response to Office Action from the Colombian Patent Office dated Dec. 27, 2012 for Colombian Application No. 10.042.683 (our matter 0117CO) with English translation corresponding to U.S. Appl. No. 12/207,913, republished as US-2010/0117588 A1 (our matter 0117US) (55 pages).
Response to Office Action from Eurasian Patent Office dated Dec. 17, 2012 for Application No. 201070369/31 (our matter 117EA) corresponding to U.S. Appl. No. 12/207,913, republished as US-2010/0117588 A1 (our matter 0117US) (15 pages).
Notification of the necessity to Submit Additional Materials from the Eurasian Patent Office dated Apr. 1, 2013 for Application No. 201070369/31 (our matter 117EA) with English translation corresponding to U.S. Appl. No. 12/207,913, republished as US-2010/0117588 A1 (our matter 0117US) (4 pages).
Response to Supplementary European Search Report from the European Patent Office mailed on Aug. 22, 2012, filed on Mar. 18, 2013 regarding European Application No. 08830045.4 (our matter 117EP) corresponding to U.S. Appl. No. 12/207,913, republished as US-2010/0117588 A1 (our matter 01177US) (21 pages).
Notice of Reasons for Refusal of Patent Application No. 2010-524881 (our matter 117JP) mailed from the Japanese Patent Office on Aug. 28, 2012 with English translation, relying on Japanese Unexamined Patent Publication HE16-261594; See NPL 4R (6 pages).

(56) References Cited

OTHER PUBLICATIONS

Response to $2^{nd}$ Office Action for Chinese Patent Application No. 200880111387.0) (our matter 0113CN) filed on Jan. 8, 2013 corresponding to U.S. Appl. No. 12/185,442, issued as US Patent No. 8085009B2 (our matter 0113US) (25 pages).
Voluntary Amendment filed on Mar. 21, 2013 for Chinese Patent Application No. 200880111387.0 (our matter 0113CN) filed on Jan. 8, 2013 corresponding to U.S. Appl. No. 12/185,442, issued as US Patent No. 8085009B2 (our matter 0113US) (22 pages).
Notification on Grant of Patent Right for Invention mailed on Apr. 9, 2013 for Chinese Patent Application No. 200880111387.0 (our matter 0113CN) filed on Jan. 8, 2013 with English translation corresponding to U.S. Appl. No. 12/185,442, issued as US Patent No. 8085009B2 (our matter 0113US) (4 pages).
Response to Office Action for Colombian Patent Application No. 10.029.658 (our matter 0113CO) filed on Feb. 20, 2013 corresponding to U.S. Appl. No. 12/185,442, issued as US Patent No. 8085009B2 (our matter 0113US) (42 pages).
Office Action from the U.S. Patent and Trademark Office mailed Mar. 13, 2013 corresponding to U.S. Appl. No. 12/873,510, published as US-2010/0320956 A1 on Dec. 23, 2010 (our matter 0123US), which is a continuation-in-part of U.S. Appl. No. 12/207,913, republished as US-2010/0117588 A1 (our matter 0117US) (15 pages).
International Search Report for International Application No. PCT/US2010/047477 (our matter 0123PCT) mailed Mar. 22, 2012 corresponding to U.S. Appl. No. 12/873,510, published as US-2010/0320956 A1 (our matter 0123US) (9 pages).
Voluntary Amendment filed on Nov. 9, 2012 for Chinese Patent Application No. 201080039849.X (our matter 0123CN) corresponding to U.S. Appl. No. 12/873,510, republished as US-2010/0320956 A1 (our matter 0123US) (8 pages).
Office Action from the U.S. Patent and Trademark Office mailed Feb. 26, 2013 corresponding to U.S. Appl. No. 12/893,539, published as US-2012/0075896 A1 (our matter 0127US) (7 pages).
International Search Report for International Application No. PCT/US2010/050714 (our matter 0127PCT) mailed Apr. 11, 2013 corresponding to U.S. Appl. No. 12/893,539, published as US-2012/0075896 A1 (our matter 0127US) (5 pages).
Office Action from the U.S. Patent and Trademark Office mailed Apr. 10, 2013 corresponding to U.S. Appl. No. 13/026,931 (our matter 0128US) (11 pages).
Notice of Allowance from the U.S. Patent and Trademark Office mailed Jun. 11, 2013 corresponding to U.S. Appl. No. 12/967,128 (our matter 0133US) (11 pages).
Office Action from the U.S. Patent and Trademark Office mailed Aug. 17, 2012 corresponding to U.S. Appl. No. 13/331,757, (our matter 0139US) (14 pages).
Response to Office Action from the U.S. Patent and Trademark Office mailed Aug. 17, 2012, filed on Nov. 15, 2012 corresponding to U.S. Appl. No. 13/331,757 (our matter 0139) (26 pages).
Final Office Action from the U.S. Patent and Trademark Office mailed Feb. 27, 2013 corresponding to U.S. Appl. No. 13/331,757 (our matter 0139) (45 pages).
Response to Office Action from the Eurasian Patent Office filed on Apr. 19, 2013 corresponding to U.S. Appl. No. 13/331,757 (our matter 0139) (13 pages).
Sul, S K and Park, M H: "A novel Technique for Optimal Efficiency Control of a Current-Source Inverter-Fed Induction Motor", IEEE Transactions on Power Electronics, vol. 3, No. 2, Apr. 1, 1988, pp. 192-199, XP002063874, ISSN: 0885-8993, DOI: 10.1109/63.4349, p. 2, left-hand column, line 9—p. 4, left-hand column, line 29; FIGS. 4-8 (8 pages); from IEEE databank attached, considered to be particularly relevant if taken alone, see NPL 3B, 3E and 3X (our matter 117EP) (16 pages).
Flemming Abrahamsen, et al.: "On the Energy Optimized Control of Standard and High-Efficiency Induction Motors in CT and HVAC Applications", IEEE Transactions on Industry Applications, IEEE Service Center, Piscataway, NJ, US, vol. 34, No. 4, Jul./Aug. 1998, XP011022398, ISSN: 0093-9994, p. 4, right-hand column, line 11—p. 5, left-hand column, line 5; FIG. 9 (10 pages): ); clean copy retrieved from IEEE databank attached, considered to be particularly relevant if taken alone, see NPL 3B, 3F and 3X (our matter 117EP) (20 pages).
International Search Report for International Application No. PCT/US2011/032840 (our matter 0128PCT) mailed Apr. 11, 2013 corresponding to U.S. Appl. No. 13/026,931 (our matter 0128US), published as US 2011-0182094 A1 (6 pages).
English language Abstract and English language translation of Japanese Unexamined Patent Publication HE16-261594; See NPL 3C and 3Y (9 pages).
Industry and Commerce Superintendency, Republic of Colombia, Resolution No. 71361, denying the Colombian patent application corresponding to US2010/0117588 (U.S. Appl. No. 12/207,913) (our matter 117), dated Nov. 26, 2012, executed by Pablo Felipe Robledo Del Castillo (6 pages), with English translation (6 pages) (Total 12 pages).

* cited by examiner

SYSTEM AND METHOD TO BOOST VOLTAGE

CROSS-REFERENCE TO RELATED APPLICATIONS

N/A

STATEMENT REGARDING FEDERALLY SPONSORED RESEARCH OR DEVELOPMENT

N/A

REFERENCE TO MICROFICHE APPENDIX

N/A

BACKGROUND OF THE INVENTION

1. Field of the Invention

This invention relates to systems and methods to increase electric voltage for residential, commercial, and industrial loads.

2. Description of the Related Art

Electricity for residential and industrial use is typically generated at an electric power generating station, and sent through transmission lines in an electricity grid to a distribution system, which carries the electricity to the consumer. In many parts of the world, electric power supply has not kept up with demand, often resulting in brownouts. A brownout is a drop in voltage in the electrical power supply, often resulting in dimming of lighting when the voltage sags. Brownout voltages sometimes drop enough to cause appliances or equipment to stop operating. Such appliances or equipment may sustain permanent damage as a result of the low voltage condition.

A brownout may be caused by (1) inadequate power generation, (2) insufficient power transmission capacity, and/or (3) insufficient power distribution capacity. Inadequate power generation and insufficient power transmission are easier to remedy than insufficient power distribution capacity. Both power generation demand and power transmission capacity can be calculated and fulfilled comparatively easily within fiscal budgets.

The main obstacle to providing sufficient power to consumers is insufficient power distribution capacity. The need for power distribution capacity cannot be easily planned for or economically implemented. Moreover, as the world population grows, and industrial participation in the world economy increases, the power distribution infrastructure will be increasingly strained or overloaded by the additional loads placed on it. The distribution problems can often be attributed to copper losses within the cabling that forms the distribution infrastructure.

A transformer transfers electrical energy from one circuit to another through inductively coupled conductors. A varying current in the first or primary windings creates a varying magnetic flux in the transformer's core, and thus a varying magnetic field through the secondary windings. If a load is connected to the secondary, an electric current will flow in the secondary windings and electrical energy will be transferred from the primary circuit through the transformer to the load. The ratio of the transformer is the number of turns in the secondary windings to the number of turns in the primary windings.

The solution to the power distribution problem often employed is to boost the incoming voltage to allow sensitive appliances to continue operating. One solution has been to use motor driven Variac type transformers that continuously adjust the voltage to the nominal voltage. However, this solution requires mechanical implementation that is prone to failure. A second solution has been to employ electronic solid-state boosters that continuously adjust the voltage to the nominal voltage. However, this solution is expensive and inefficient. A third solution is to use relay switched transformers. The problem with this solution is that the mechanical contacts are prone to failure with the high currents being switched. Finally, manually switched transformers have been tried. This solution is undesirable because it requires a person in attendance, and the transformer can be inadvertently left in the boost position. Each of the above solutions of the past has problems of safety, efficiency, cost, complexity and/or reliability. The solutions of the past that utilize transformers and switching perform the switching on the transformer secondary windings side, where disadvantageous high currents are present. There is also a disadvantageous interruption of current with such prior solutions during the switching period.

Pub. No. U.S. 2009/0046490 proposes an IGBT/FET-based energy savings device, system and method wherein a predetermined amount of voltage below a nominal line voltage and/or below a nominal appliance voltage is saved. Pub. No. U.S. 2009/0051344 proposes a TRIAC/SCR-based energy savings device, system and method wherein a predetermined amount of voltage below a nominal line voltage and/or below a nominal appliance voltage is saved. Pub. No. U.S. 2009/0200981 proposes a system and method for providing constant loading in AC power applications wherein at least one turn-on point of at least one half cycle of a modulating sine wave is determined, at least one turn-off point of the at least one half cycle of the modulating sine wave is determined, and at least one slice located between the at least one turn-on point and the at least one turn-off point in removed. Pub. No. U.S. 2010/003155 proposes a power supply for IGBT/FET drivers that provides separated, isolated power to each IGBT/FET driver.

U.S. Pat. No. 6,489,742 proposes a motor controller that includes power conveyance to an induction motor with a digital signal processor that calculates and optimizes supply of current for existent motor loading from a power supply and main voltage through a control element. Pub. No. U.S. 2010/0117588 proposes a motor controller for maximizing the energy savings in an AC induction motor at every load wherein the motor is calibrated at two or more load points to establish a control line, which is then programmed into a non-volatile memory of the motor controller.

The above discussed U.S. Pat. No. 6,489,742 and Pub. Nos. U.S. 2009/0046490; 2009/0051344; 2009/0200981; 2010/0033155; and 2010/0117588 are incorporated herein by reference for all purposes in their entirety.

A need exists for a safe, inexpensive, reliable, and efficient way to boost voltage that places a minimum additional load on the electricity grid.

BRIEF SUMMARY OF THE INVENTION

A transformer's primary windings may be attached at a first end to the hot input line and at a second end with an electronic switch. The transformer's secondary windings may be connected between the hot input line and the hot output line, and are not switched. The transformer's secondary windings may be in series for 220/230 Vrms and in parallel for 120/127 Vrms. Alternatively, the transformer may be a single voltage type specifically for 230 V, 120 V, or any other voltage range.

A microprocessor measures the AC incoming line voltage, and compares it with a predetermined voltage level. When the measured voltage is higher than the predetermined level and no voltage increase is needed, the microprocessor controls the switch to connect the primary windings second end with the primary windings first end, short circuiting the primary windings of the transformer. The short circuiting of the primary windings substantially eliminates the reactive component of the current from the secondary windings side.

When the measured voltage is less than the predetermined level and voltage increase is needed, the microprocessor controls the switch to connect the primary windings second end to neutral and simultaneously remove the short circuit from the transformer. When the primary windings second end is switched to neutral, the secondary voltage adds to the mains input voltage, thereby providing a boosted output voltage. The amount of boosted voltage may be selected and maintained by the transformer turns ratio. There may be multiple taps on the primary windings selected by the microprocessor for providing differing boost levels at differing input voltage levels.

The switching on the primary windings side may be performed with different switch embodiments, including, but not limited to, (1) a diode bridge circuit in conjunction with an IGBT, (2) a diode bridge circuit in conjunction with a power MOSFET, (3) a diode bridge circuit in conjunction with a mechanical switch, relay, contactor or any other type of mechanical switch, (4) a diode bridge circuit in conjunction with an SCR/Thyristor or a TRIAC, (5) a TRIAC, (6) SCR/Thyristor devices arranged in an inverse parallel arrangement, or (7) a mechanical switch, relay, contactor or any other type of mechanical switch. One or more power supplies may power the switch and/or the microprocessor. Transformers with different voltage and current ratings and/or turns ratios may be removably plugged or connected with the system.

The switching on the primary side may be performed at substantially lower current than on the secondary side, allowing for the use of smaller more reliable switches. Also, the switching on the primary side provides for substantially no interruption of current during the switching period.

BRIEF DESCRIPTION OF THE DRAWINGS

A better and further understanding of the invention can be obtained with the following detailed descriptions of the various disclosed embodiments in the drawings in which like parts are given like reference numerals, and wherein.

DETAILED DESCRIPTION OF THE INVENTION

Figure 1A:
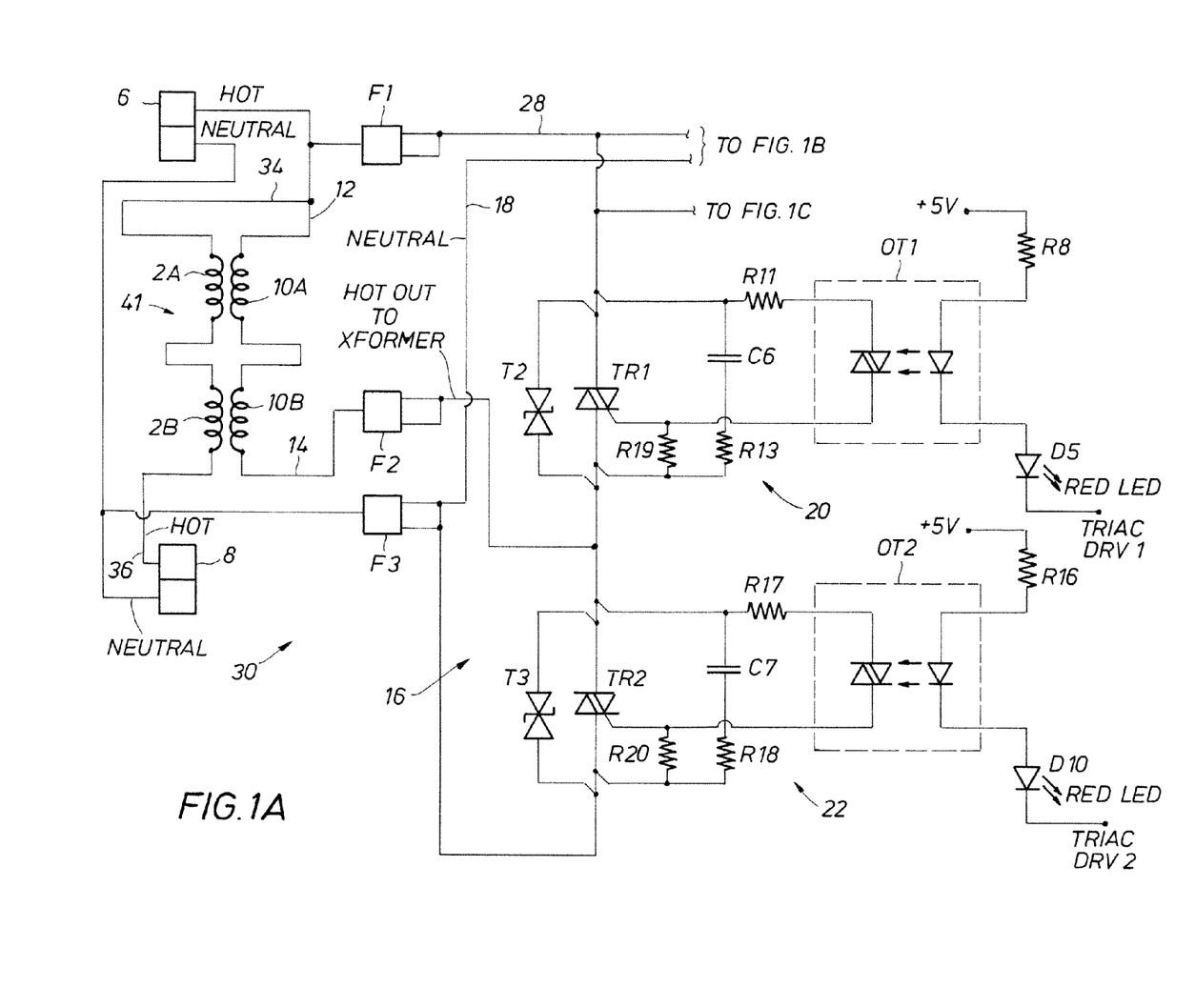
FIG. 1A is a partial circuit diagram of a first embodiment of a voltage booster apparatus showing a transformer and an electronic switch with two solid state relays.
Figure 1B:
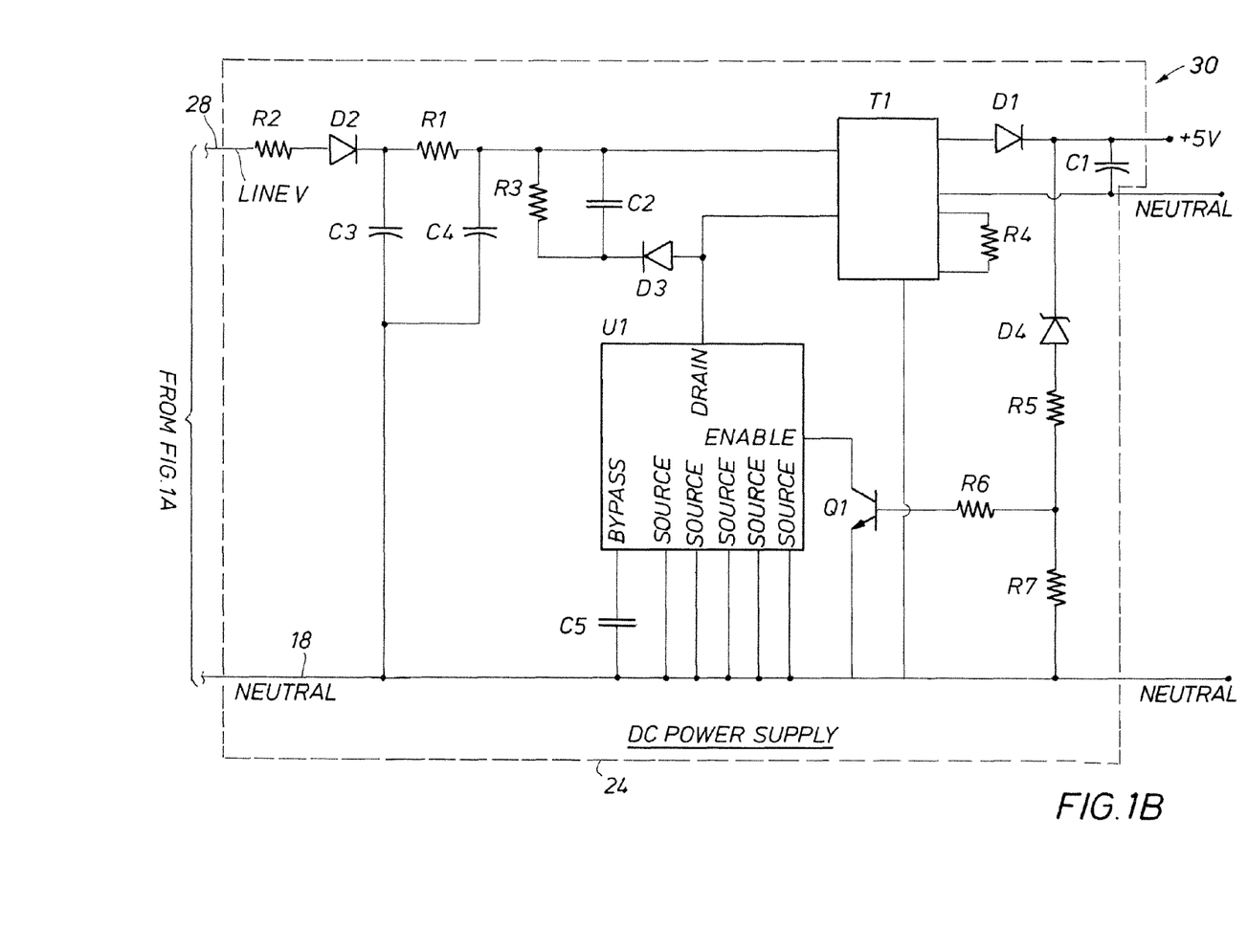
FIG. 1B is a partial circuit diagram of a first embodiment of a voltage booster apparatus showing a DC power supply.
Figure 1C:
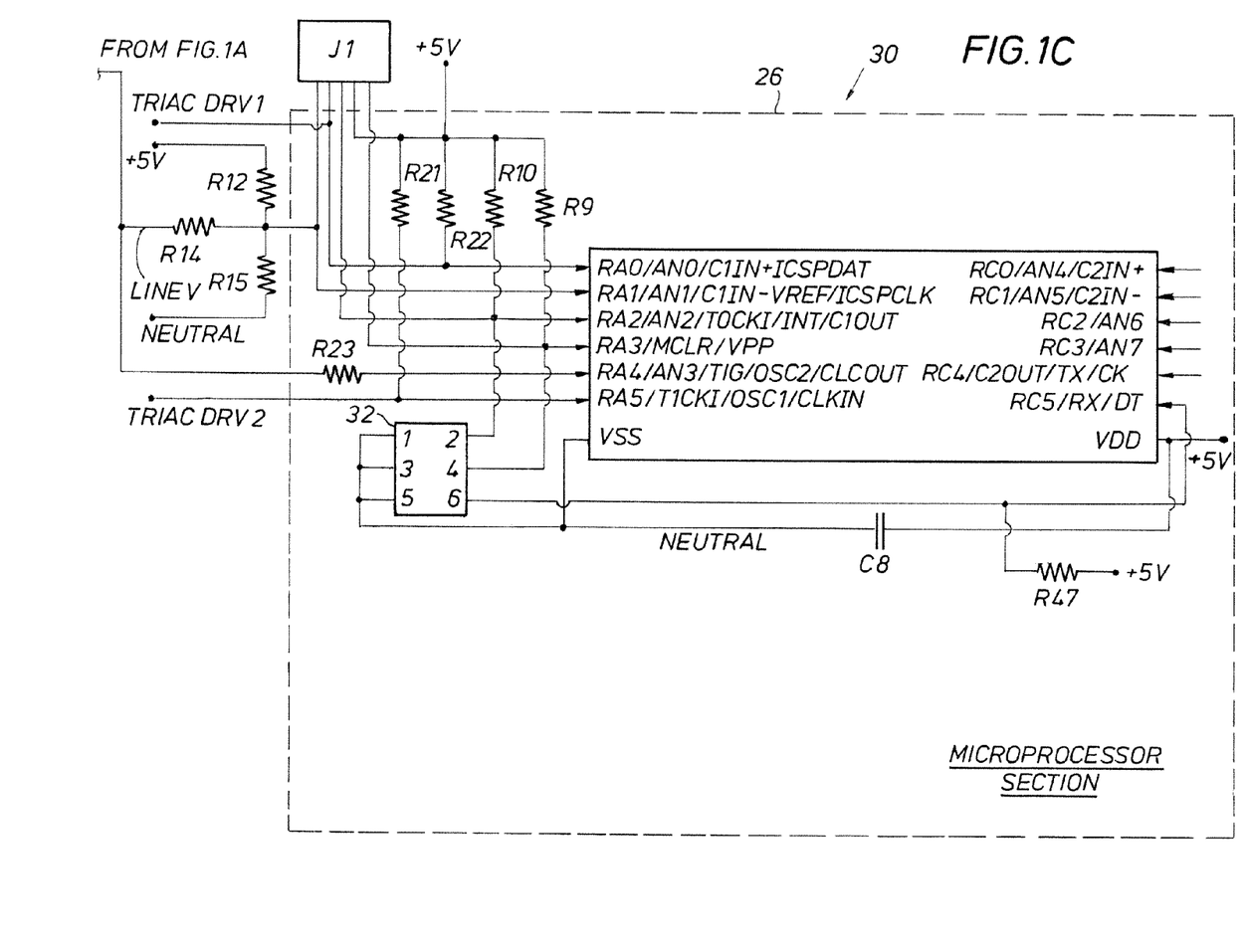
FIG. 1C is a partial circuit diagram of a first embodiment of a voltage booster apparatus showing a microprocessor.

FIGS. 1A-1C taken together show a first embodiment of a voltage booster apparatus 30 configured for 220/230 Voltage root mean square (Vons). The voltage booster apparatus 30 may also be configured for 120/127 Vrms. FIG. 1A shows transformer 41 and switch 16. Switch 16 comprises first relay 20 and second relay 22. FIG. 1B shows power supply 24. FIG. 1C shows microprocessor 26. Turning to FIG. 1A, secondary windings 2A and 213 of transformer 41 are in series between the input line hot terminal 6 and the output line hot terminal 8. Hot input line 34 to hot output line 36 passes through the transformer secondary windings 2A and 213 at all times, and is not switched. To configure for 120/127 Vrms, then the secondary windings 2A and 2B would be in parallel. Alternatively, the transformer may be a single voltage type specifically for 230 V, 120 V, or any other voltage range.

The transformer primary windings 10A and 10B have first end or first line 12 connected to hot input terminal 6 and second end or second line 14 connected through connector F2 with electronic switch 16. Switch 16 allows transformer second line 14 to either (1) connect with first line 12 of the transformer primary windings 10A, 10B, thereby short-circuiting the transformer 41, or (2) connect with neutral line 18. Connectors (F1, F2, F3) are Faston type connectors. The connectors (F1, F2, F3) allow for the removably plugging in of different current rated transformers allowing for greater or lesser loads. Other types of connectors are also contemplated.

When the transformer primary windings second line 14 is switched to neutral, the secondary voltage adds to the mains input voltage, thereby providing boosted or increased output voltage at hot output terminal 8. An electrical load may be connected at hot output terminal 8, such as a residential, commercial or industrial load. The winding voltage is phased to be additive to the incoming AC line voltage, thereby providing boosted voltage when needed. When the microprocessor 26 switches to increased or boosted voltage, the boosted voltage may be maintained at the incoming Vrms multiplied by the percentage ratio of the transformer turns ratio.

When switch 16 is switched to the other condition, state, or position, removing the second line 14 connection from neutral and connecting it with first line 12, the transformer primary windings 10A and 10B are short circuited. By creating a short circuit in the non-boosted condition or state, the transformer 41 is disconnected and does not consume any power. Also, since the primary 10A and 10B is shorted out, and the secondary 2A and 2B is permanently connected between input terminal 6 and output terminal 8, there will be substantially no reactive component of current in the secondary side and therefore substantially no inductively reactive losses are incurred during non-boost operation. The only impediments to the passage of the AC power from hot input 6 to hot output 8 will be the very small ohmic resistance of the copper or other windings of the secondary windings 2A and 2B.

The switching is advantageously performed on the transformer primary side (10A, 10B). While switching could take place on the secondary side (2A, 2B) of the transformer 41, disadvantageous high currents would be present. Since the transformer 41 may have a ratio of ten (10) to one (1), only one-tenth of the current would need be switched in the primary side (10A, 10B) of the transformer 41. Other transformer ratios are also contemplated. The transformer ratio is the number of turns in the secondary (2A, 2B) to the number of turns in the primary (10A, 10B). In all embodiments, this technique of switching on the primary side allows for the use of smaller more reliable switches for lower current, such as relay devices 20 and 22, as compared to much more expensive devices if the switching were to take place at the secondary side (2A, 2B) of the transformer 41. Also, the switching on the primary side advantageously provides for no interruption of power during the switching period. Although two relay devices 20 and 22 are shown, it is also contemplated that there may be more than two of the devices (20, 22).

Power supply 24 (FIG. 1B) may provide power to the switching network 16 and microprocessor 26. A small inexpensive five (5) volt DC power supply may be employed to power the switch 16 and/or microprocessor 26, although other power supplies and voltages are also contemplated, including alternating current. Devices 20 and 22 (FIG. 1A) may each consist of an optically coupled driver in communication with a small TRIAC device, thereby forming two solid-state AC relays. Opto-electronically (opto) isolated Triac drivers using opto isolated TRIACS (OT1, OT2) are contemplated. Other types of relays are contemplated. It is also contemplated that the voltage may be controlled through the use of other power control devices, including TRIACs, SCRs, IGBTs, and/or MOSFETs.

Microprocessor 26 (FIG. 1C) measures the AC incoming line voltage, such as in lines 34 or 28, and decides the voltage level at which the increased voltage should be employed. Other types of processors are also contemplated. Three small jumper blocks or 3×2 header 32 may allow the selection of the six (6) voltages as shown below in Table 1 and on FIG. 2C:

TABLE 1

| | JUMPER VOLTAGE SELECTION | | |
|---|---|---|---|
| SET VOLTAGE | CONTACTS 1 & 2 | CONTACTS 3 & 4 | CONTACTS 5 & 6 |
| 200 Volts | OUT | OUT | OUT |
| 190 Volts | IN | OUT | OUT |
| 180 Volts | OUT | IN | OUT |
| 170 Volts | IN | IN | OUT |
| 160 Volts | OUT | OUT | IN |
| 210 Volts | IN | OUT | IN |
| OPTION 1 | OUT | IN | IN |
| OPTION 2 | IN | IN | IN |

Other predetermined voltage settings are also contemplated. Other numbers of jumper blocks or headers 32 are also contemplated. The microprocessor 26 operates and controls the relay devices 20 and 22 according to the selected voltage.

The microprocessor 26 utilizes detection of the zero voltage crossing point of the incoming AC mains voltage. This zero cross detection is used to assure correct timing of the switching of the solid-state relays 20 and 22. Zero cross timing eliminates the possibility of both relays 20 and 22 being on at the same time. FIGS. 5 and 6 of Pub. No. U.S. 2009/0046490 propose an oscillogram and circuitry diagram, respectively, of a volts zero crossing point determining means that is contemplated. Other types of volts zero crossing point determining means are also contemplated. Hysteresis may be employed to eliminate any erratic switching around the threshold point set by the jumpers 32.

In FIGS. 1A-1C, components R1 to R23 are resistors, components C1 to C8 are capacitors, components D1 to D3 are diodes, component D4 is a Zener diode, components D5 and D10 are light emitting diodes, component T1 is a transformer, components T2 and T3 are transorb devices, component Q1 is an NPN transistor, component U1 is a switching regulator, components TR1 and TR2 are TRIACs, components OT1 and OT2 are opto isolated TRIACS, and component J1 is a jumper block or 1×5 header.

Figure 2:
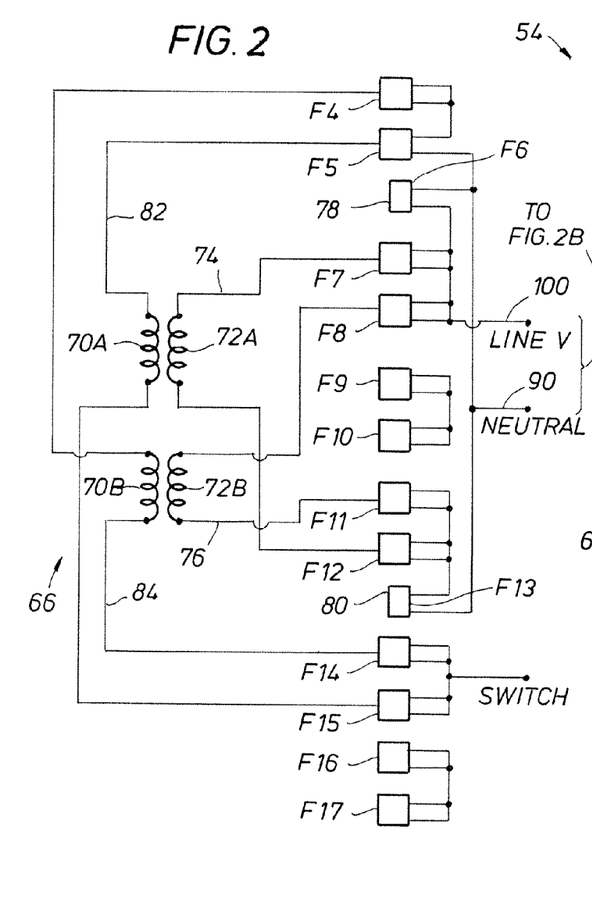
FIG. 2 is a partial circuit diagram of a second embodiment of a voltage booster apparatus showing the wiring arrangement for an exemplary 120V transformer.
Figure 2A:
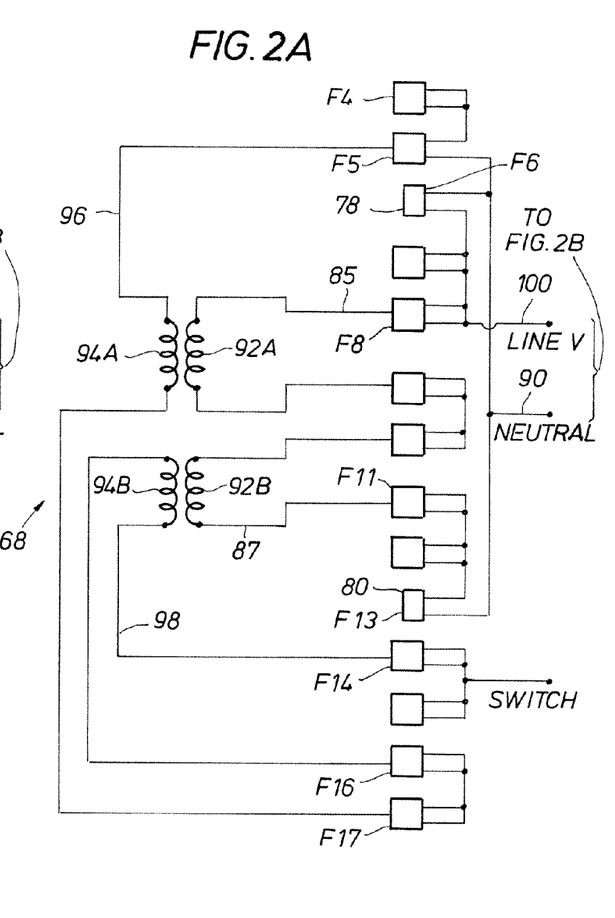
FIG. 2A is a partial circuit diagram of a second embodiment of a voltage booster apparatus showing the wiring arrangement for an exemplary 230V transformer.
Figure 2B:
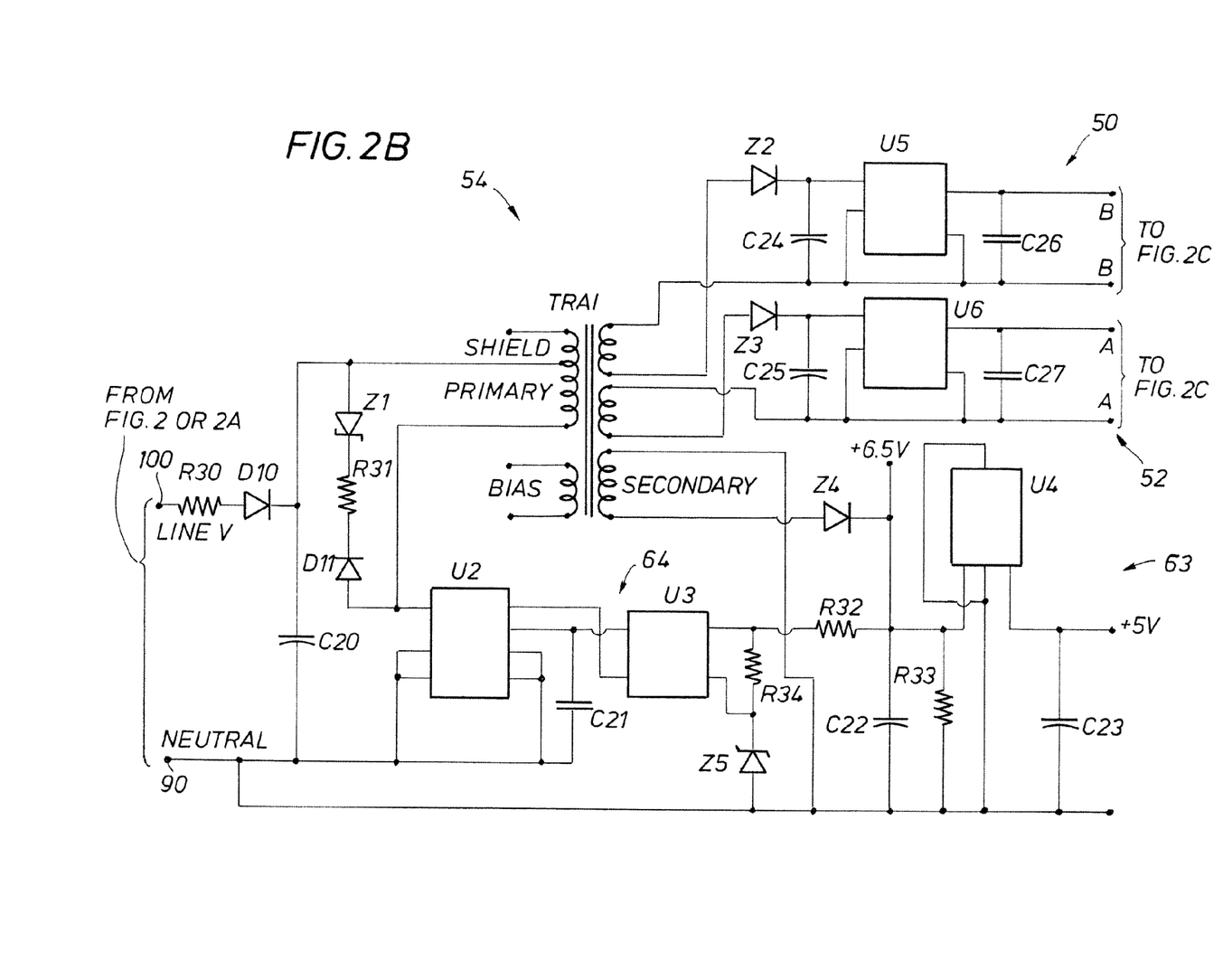
FIG. 2B is a partial circuit diagram of a second embodiment of a voltage booster apparatus showing DC power supplies and related circuitry.
Figure 2C:
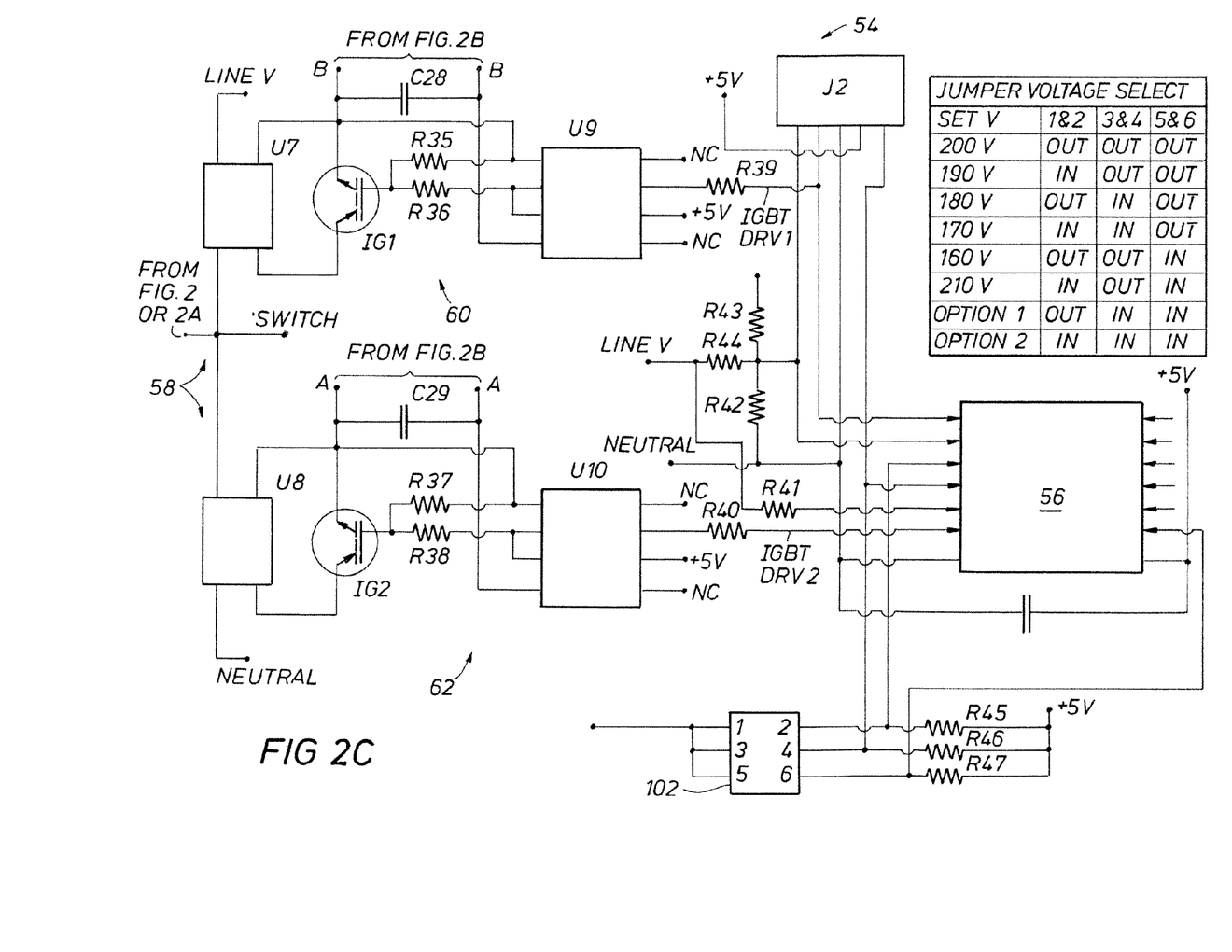
FIG. 2C is a partial circuit diagram of a second embodiment of a voltage booster apparatus showing a microprocessor and two diode bridge circuits each connected with an IGBT device.

FIGS. 2-2C taken together show a second embodiment of a voltage booster apparatus 54. FIG. 2 shows exemplary 120 Volt transformer 66. FIG. 2A shows exemplary 230 Volt transformer 60. The wiring arrangements are different in FIGS. 2 and 2A. The windings for the 120 Volt transformer 66 (FIG. 2) are in parallel, and the windings for the 230 Volt transformer 68 (FIG. 2A) are in series. The same transformer 66, 68 may be used for 120 Volt and for 230 Volt by configuring the wiring arrangements as shown: parallel for 120 Volts and series for 230 Volts. However, different 66, 68 transformers may be used as well. The transformer may be a single voltage type specifically for 230 V, 120 V, or any other voltage range. Other transformers with different current ratings are also contemplated. Only one such transformer 66, 68 would be connected with the system at a time. FIG. 2B shows two isolated DC power supplies (50, 52), power supply 63, and power supply regulation circuitry 64. FIG. 2C shows microprocessor 56 and IGBT switch device 58. Switch 58 comprises first diode bridge circuit U7, first IGBT circuit 60, second diode bridge circuit U8, and second IGBT circuit 62.

Turning to FIG. 2, secondary windings 72A and 72B of 120 Volt transformer 66 are in parallel between the input line hot terminal 78 and the output line hot terminal 80. Hot input line 74 to hot output line 76 passes through the transformer secondary windings 72A and 72B at all times, and is not switched. The transformer 66 primary windings 70A and 70B have first end or first line 82 connected to hot input terminal 78 through connector F5, and second end or second line 84 connected through connector F14 with electronic switch 58. Switch 58 allows transformer 66 second line 84 to either (1) connect with first line 82 of the transformer 66 primary windings 70A, 70B, thereby short-circuiting the transformer 66, or (2) connect with neutral line 90. Connectors F4 through F17 are Faston type connectors. The connectors (F1 to F17) allow for the removably plugging in or connecting of different rated transformers (66, 68), such as 120V and 230V. Other types of connectors are also contemplated.

In FIG. 2A, the 230V transformer 68, like the 120V transformer 66, may be removably plugged or unplugged into the same connectors (F1 to F17). However, the wiring arrangement for transformer 68 is different. Other arrangements of wiring and connection are also contemplated. The transformer 68 secondary windings 92A and 92B are in series between the input line hot terminal 78 and the output line hot terminal 80. Hot input line 85 passes through connector F8 to terminal 78. Hot output line 87 passed through connector F11 to terminal 80. Hot input line 85 to hot output line 87 passes through the transformer secondary windings 92A and 92B at all times, and is not switched. The transformer 68 primary windings 94A and 94B have first end or first line 96 connected to hot input terminal 78 through connector F5, and second end or second line 98 connected through connector F14 with electronic switch 58. Switch 58 allows transformer 68 second line 98 to either (1) connect with first line 96 of the transformer 68 primary windings 94A, 94B, thereby short-circuiting the transformer 68, or (2) connect with neutral line 90.

As can now be understood, the same transformer may be used for 120 V and 230 V, with the connections shown in FIGS. 2-2A configuring the transformer for 120 V (FIG. 2) or 230 V (FIG. 2A) as desired. When the transformer primary windings second line 84, 98 is switched to neutral, the secondary voltage adds to the mains input voltage, thereby providing boosted output voltage at hot output terminal 80. An electric load may be connected with output terminal 80. The winding voltage is phased to be additive to the incoming AC line voltage, thereby providing boosted voltage when needed.

When switch 58 is switched to the other state or condition, removing the primary windings second line 84, 98 connection from neutral and connecting it with respective first line 82, 96, the transformer primary windings (70A, 70B) or (94A, 94B) are short circuited. By creating a short circuit in the non-boosted position, the transformer is disconnected and does not consume any power. Also, since the primary is shorted out, and the secondary is permanently connected between hot input terminal 78 and hot output terminal 80, there will be substantially no reactive component of the current on the secondary windings side and therefore substantially no inductively reactive losses during non-boost operation. The only impediments to the passage of the AC power from input 78 to output 80 will be the very small ohmic resistance of the copper or other windings of the secondary windings. As with the first embodiment, the switching is advantageously performed on the transformer primary side, which allows for switching with less current. Also, there is substantially no interruption of power during the switching period.

Turning to FIG. 2B, three independent power supplies (50, 52, 63) may provide power to switching network 58 and/or microprocessor 56. First power supply 50 provides power to first IGBT circuit 60, and second power supply 52 provides power to second IGBT circuit 62. It is contemplated that the arrangement could be reversed. Third power supply 63 may provide power for microprocessor 56, LEDs, and Optos. Other arrangements are also contemplated. First and second power supplies (50, 52) may each provide twelve (12) volt DC power, and third power supply 63 may provide five (5) volt DC power, although other power supplies and voltages are also contemplated, including alternating current. It is contemplated that there may be only one power supply, or more than three power supplies.

In FIG. 2C, first diode bridge circuit U7 is configured with first IGBT circuit 60 comprising first IGBT device IG1 and first optically isolated IGBT/MOSFET driver U9. Second diode bridge circuit U8 is configured with second IGBT circuit 62 comprising second IGBT device IG2 and second optically isolated IGBT/MOSFET driver U10. Diode bridge circuits U7, U8 are used to steer the current positive and negative half cycles to arrive at a condition known as unidirectional half cycles. This enables the use of a single IGBT device IG1 and IG2 since the IGBT is a unidirectional device. MOSFET devices are also contemplated.

Switch 58 functions like a single pole, double throw (SPDT) switch, sometimes referred to as a "changeover switch." When the respective IGBT device IG1 or IG2 is in an OFF condition, state, or position, then no AC current flows through the respective diode bridge U7, U8. When the respective IGBT device IG1 or IG2 is in an ON condition, state, or position, then AC current flows through the respective diode bridge U7, U8. Microprocessor 56 measures the AC incoming line voltage, such as in line 100, and decides the voltage level at which the increased voltage should be employed. Three small jumper blocks or 3×2 header 102 may allow the selection of the six (6) voltages as shown in Table 1 above and in FIG. 2C. Other predetermined voltage settings are also contemplated. Other numbers of jumper blocks or header 102 are also contemplated. The microprocessor 56 operates and controls the IGBT switch device 58 to maintain the selected voltage.

The microprocessor 56 may utilize detection of the zero voltage crossing point of the incoming AC mains voltage. This zero cross detection is used to assure correct timing of the switching of the IGBT devices IG1 and IG2. Zero cross timing eliminates the possibility of both devices IG1 and IG2 being on at the same time. FIGS. 5 and 6 of Pub. No. U.S. 2009/0046490 propose an oscillogram and circuitry diagram, respectively, of a volts zero crossing point determining means that is contemplated. Other types of volts zero crossing point determining means are also contemplated. Hysteresis may be employed to eliminate any erratic switching around the threshold point set by the jumpers 102.

In FIGS. 2-2C, components R30 to R47 are resistors, components C20 to C29 are capacitors, components D10 and D11 are diodes, component Z1 is a transorb, components Z2 to Z4 may be (Schottky type) diodes, component Z5 is a Zener diode, components IG1 and IG2 are IGBT transistors, component TRA1 is a transformer, component U2 is a switching regulator, component U3 is an Opto isolator, components U4 to U6 are linear regulators, components U7 and U8 are diode bridge circuits or bridge rectifiers, component U9 and U10 are optically isolated IGBT/MOSFET drivers, and component J2 is a 1×5 header.

As can now be understood, all switching may be performed at substantially less current on the primary side, such as primary side (10A, 10B) of the transformer 41, than on the secondary side, such as secondary side (2A, 2B) of transformer 41. Since the secondary windings are permanently connected, and the boost switching is performed on the primary side, there will be substantially no interruption of electricity during the switching period. This cannot be achieved when switching is performed on the secondary side. Different embodiments of electronic switches (16, 58) are employed to short circuit the transformer primary when it is not in use, thereby eliminating the reactive component of the current from the secondary winding side. The transformer is only active during the voltage boost period. The amount of boost or increase may be selected by the transformer ratio. Transformers with different ratios and/or current ratings may be removably connected with the system. The apparatus may be used for universal operation for AC 120 Volts to 250 Volts. The apparatus size may be relatively small. There may be very small thermal dissipation. The apparatus may be cost effective and reliable. The apparatus may be used to supply increased voltage for electric loads, including residential, industrial or commercial.

Although two switching network embodiments are shown in the Figures, other embodiments are contemplated, including, but not limited to, the switching performed with (1) a diode bridge in conjunction with an IGBT, (2) a diode bridge in conjunction with a power MOSFET, (3) a diode bridge in conjunction with a mechanical switch, relay, contactor or any other type of mechanical switch, (4) a diode bridge in conjunction with an SCR/Thyristor or a TRIAC, (5) TRIAC, (6) SCR/Thyristor devices arranged in an inverse parallel arrangement, or (7) a mechanical switch, relay, contactor or any other type of mechanical switch. The switches may be used to provide a first state, condition, or position short circuiting the primary windings, and a second state, condition, or position for adding the transformer secondary voltage with the mains input voltage. In all embodiments, other transformer primary windings taps are contemplated to provide different boost levels at a variety of threshold voltages. The taps may allow a certain number of turns of the transformer primary winding to be selected, providing a transformer with a variable turns ratio. For all embodiments, there may be multiple taps on the primary windings selected by the microprocessor for providing differing boost levels at differing input voltage levels.

The foregoing disclosure and description of the invention are illustrative and explanatory thereof, and various changes in the details of the illustrated apparatus and system, and the construction and the method of operation may be made without departing from the spirit of the invention.

I claim:

1. An apparatus for increasing voltage, comprising:
   a transformer;
   a microprocessor; and
   an electronic switch;
   wherein said transformer having secondary windings between a hot input line and a hot output line;
   wherein said transformer having primary windings in electrical connection at a first end with said hot input line and at a second end with said switch;
   wherein said switch having a first condition wherein said primary windings second end is in electrical connection with said hot input line, and a second condition wherein said primary windings second end is in electrical connection with neutral; and
   wherein said microprocessor in electrical connection with said hot input line and said switch.

2. The apparatus of claim 1, further comprising:
   a power supply;
   wherein said power supply in electrical connection with said switch for providing power to said switch.

3. The apparatus of claim 1, wherein said transformer secondary windings in series.

4. The apparatus of claim 1, wherein said transformer secondary windings in parallel.

5. The apparatus of claim 1, wherein said switch comprising a diode bridge circuit in electrical connection with an IGBT device.

6. The apparatus of claim 5, wherein said IGBT device is in an on condition when AC current flows through said diode bridge circuit, and said IGBT device is in an off condition when no AC current flows through said diode bridge circuit.

7. The apparatus of claim 1, wherein said switch comprising a solid state AC relay with an optically coupled driver in communication with a TRIAC.

8. The apparatus of claim 1, wherein said switch first condition short circuiting said primary windings, and said switch second condition for adding a transformer secondary voltage with a mains input voltage.

9. The apparatus of claim 2, wherein said microprocessor configured to measure a voltage in said hot input line and to control said switch in response to said voltage.

10. The apparatus of claim 9, further comprising a means for detection of the zero crossing point of a voltage in said hot input line.

11. The apparatus of claim 10, wherein said microprocessor configured to control said switch in response to said zero crossing point.

12. The apparatus of claim 10, wherein said transformer removable and replaceable with Faston type connectors.

13. A system for increasing voltage, comprising:
   an electric utility grid;
   a transformer;
   a microprocessor;
   a power supply; and
   an electronic switch;
   wherein said utility grid in electrical connection with a hot input line of said transformer;
   wherein said transformer having secondary windings between said hot input line and a hot output line;
   wherein said transformer having primary windings being in electrical connection at a first end with said hot input line and at a second end with said switch;
   wherein said switch having a first state short circuiting said primary windings, and a second state for adding a transformer secondary voltage with as mains input voltage;
   wherein said microprocessor in electrical connection with said hot input line and said switch; and
   wherein said power supply in electrical connection with said switch for providing power to said switch.

14. The system of claim 13, wherein in said switch first state said primary windings second end in electrical connection with said hot input line, and in said switch second state said primary windings second end in electrical connection with neutral.

15. The system of claim 14, further comprising:
   an electrical load in electrical connection with said hot output line of said transformer.

16. The system of claim 14, wherein said transformer secondary windings in series.

17. The system of claim 14, wherein said transformer secondary windings in parallel.

18. The system of claim 14, wherein said switch comprising a first diode bridge circuit in electrical connection with a first IGBT device, and a second diode bridge circuit in electrical connection with a second IGBT device.

19. The system of claim 18, wherein when said first IGBT device is in an on state then AC current flows through said first diode bridge circuit, and when said first IGBT device is in an off state then no AC current flows through said first diode bridge circuit.

20. The system of claim 19, further comprising a means for detection of the zero crossing point of a voltage in said hot input line for insuring that when said first IGBT device is in an on state, that said second IGBT device is in an off state.

21. The system of claim 14, wherein said switch comprising two solid state AC relays each having an optically coupled driver in communication with a TRIAC.

22. The system of claim 14, wherein said microprocessor configured to measure a voltage in said hot input line, and to operate said switch in response to said voltage.

23. A method for increasing voltage, comprising the steps of:
   providing a transformer with the transformer's secondary windings between a hot input line and a hot output line, and the transformer's primary windings in electrical connection at a first end with said hot input line and at a second end with an electronic switch;
   receiving a voltage from an electric utility grid in said hot input line;
   measuring said grid voltage received in said input line; and
   controlling said switch to a first condition electrically connecting said primary windings second end with said hot input line when said grid voltage greater than a predetermined amount.

24. The method of claim 23, further comprising the step of:
   eliminating the reactive component of a current in said second windings by short circuiting said transformer primary windings.

25. The method of claim 23, further comprising the steps of:
   controlling said switch to a second condition electrically connecting said second end to neutral when said grid voltage less than said predetermined amount; and
   increasing the voltage in said hot output line with said transformer to said predetermined amount using said switch.

26. The method of claim 25, wherein there is no interruption of the voltage in said hot output line during the controlling of said switch from said first condition to said second condition.

27. The method of claim 25, wherein said switch first condition short circuiting said primary windings, and said switch second condition for adding a transformer secondary voltage with a mains input voltage.

28. The method of claim 25, further comprising the step of:
maintaining the voltage in said hot output line with said transformer at said predetermined amount.

29. The method of claim 28, wherein said transformer secondary windings in series.

30. The method of claim 28, wherein said transformer secondary windings in parallel.

31. The method of claim 28, wherein said transformer's turns ratio used to maintain the voltage during the step of maintaining.

32. The method of claim 28, wherein said controlling performed by a microprocessor.

33. The method of claim 28, wherein said switch comprising a diode bridge circuit in electrical connection with an IGBT device.

34. The method of claim 33, wherein when said IGBT device is in an on condition then AC current flows through said diode bridge circuit, and when said IGBT device is in an off condition then no AC current flows through said diode bridge circuit.

35. The method of claim 28, wherein said switch comprising a solid state AC relay having an optically coupled driver in communication with a TRIAC.

36. The method of claim 28, further comprising the steps of:
detecting, the zero crossing, point of said grid voltage in said hot input line; and
operating said switch using said zero crossing point.

37. The method of claim 28, further comprising the step of:
supplying voltage from said transformer hot output line to an electrical load.

* * * * *